United States Patent [19]
Hatano et al.

[11] Patent Number: 5,966,930
[45] Date of Patent: Oct. 19, 1999

[54] CATALYST DETERIORATION-DETERMINING SYSTEM FOR INTERNAL COMBUSTION ENGINES

[75] Inventors: Gaku Hatano; Hideo Moriwaki; Yoshiaki Matsuzono; Sachito Fujimoto; Hisato Shimizu; Yuji Fujiki, all of Wako, Japan

[73] Assignee: Honda Giken Kogyo Kabushiki Kaisha, Tokyo, Japan

[21] Appl. No.: 08/914,823

[22] Filed: Aug. 20, 1997

[30] Foreign Application Priority Data

| Aug. 22, 1996 | [JP] | Japan | 8-238677 |
| Oct. 21, 1996 | [JP] | Japan | 8-297057 |
| Oct. 29, 1996 | [JP] | Japan | 8-302345 |

[51] Int. Cl.$^6$ .................................................. F01N 3/00
[52] U.S. Cl. .............................................. 60/276; 60/277
[58] Field of Search ............................ 60/276, 277, 274, 60/301; 73/118.1

[56] References Cited

U.S. PATENT DOCUMENTS

| 5,325,664 | 7/1994 | Seki et al. | 60/277 X |
| 5,337,558 | 8/1994 | Komatsu | 60/277 X |
| 5,381,657 | 1/1995 | Takizawa et al. | 60/277 X |
| 5,406,789 | 4/1995 | Takizawa et al. | 60/277 X |
| 5,448,886 | 9/1995 | Toyoda | 60/277 X |
| 5,487,269 | 1/1996 | Atanasyan et al. | 60/277 X |
| 5,509,267 | 4/1996 | Theis | 60/277 X |
| 5,526,643 | 6/1996 | Mukaihira et al. | 60/277 X |
| 5,528,898 | 6/1996 | Nakayama et al. | 60/277 X |
| 5,626,014 | 5/1997 | Hepburn et al. | 60/277 X |
| 5,724,952 | 3/1998 | Miyashita et al. | 60/277 X |
| 5,732,551 | 3/1998 | Naber et al. | 60/277 X |
| 5,732,552 | 3/1998 | Matsumoto et al. | 60/277 X |

*Primary Examiner*—John E. Ryznic
*Attorney, Agent, or Firm*—Nikaido, Marmelstein, Murray & Oram LLP

[57] ABSTRACT

A catalyst deterioration-determining system for an internal combustion engine has a catalyst arranged in the exhaust system, for purifying exhaust gases emitted from the engine, an oxygen concentration sensor arranged in the exhaust system at a location downstream of the catalyst, for detecting the concentration of oxygen present in the exhaust gases, and an ECU which controls the air-fuel ratio of an air-fuel mixture supplied to the engine in a feedback manner in response to the output from the oxygen concentration sensor. Determination of deterioration of the catalyst is carried out based on the output from the oxygen concentration sensor during execution of air-fuel ratio feedback control. An inversion period parameter representative of a repetition period of change in the output from the oxygen concentration sensor over a predetermined diagnosis period is measured, and a determination parameter is calculated by averaging values of the inversion period parameter measured over different diagnosis periods as the predetermined diagnosis period. The determination of deterioration of the catalyst is carried out based on the determination parameter.

21 Claims, 21 Drawing Sheets

FIG.6A KO2

FIG.6B SVO2

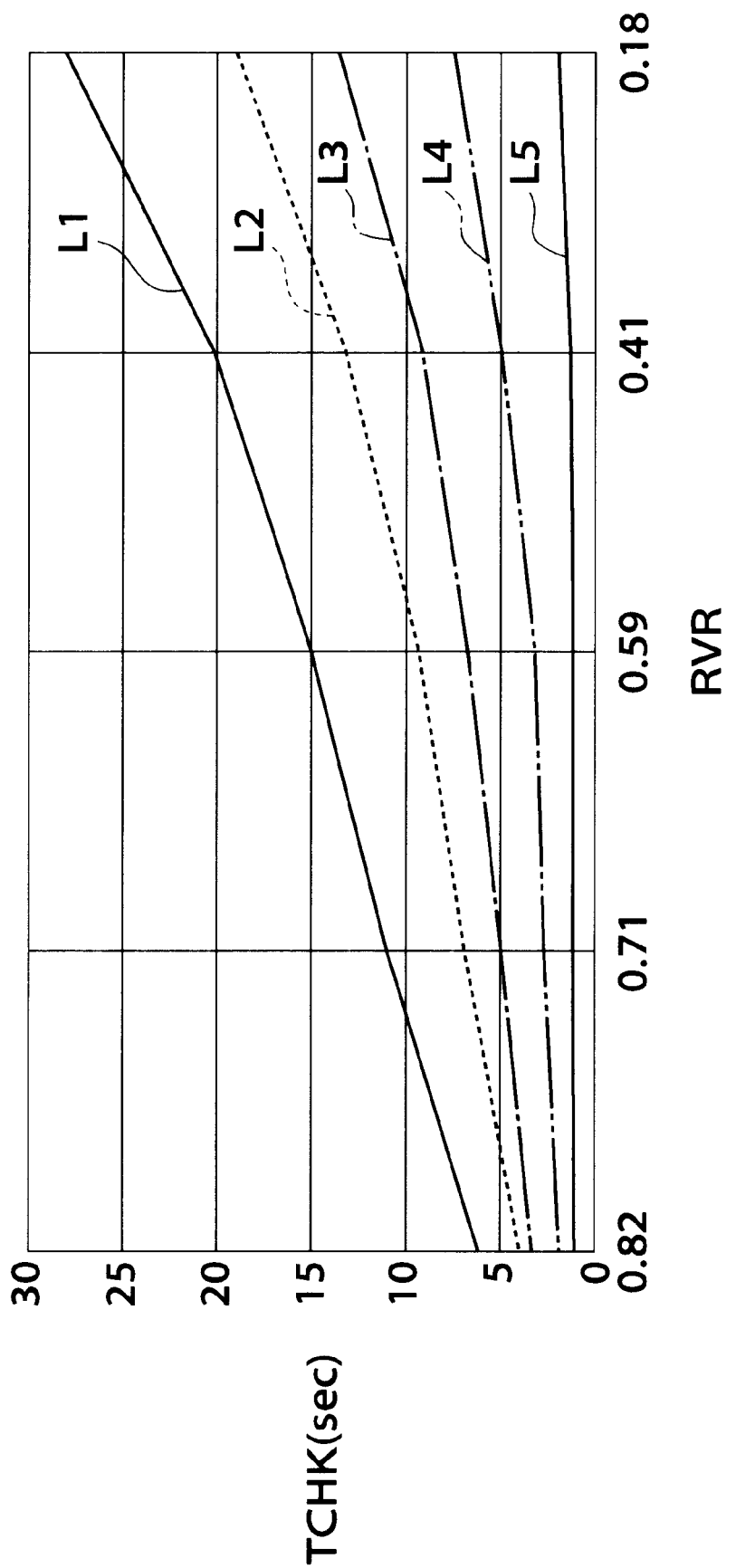

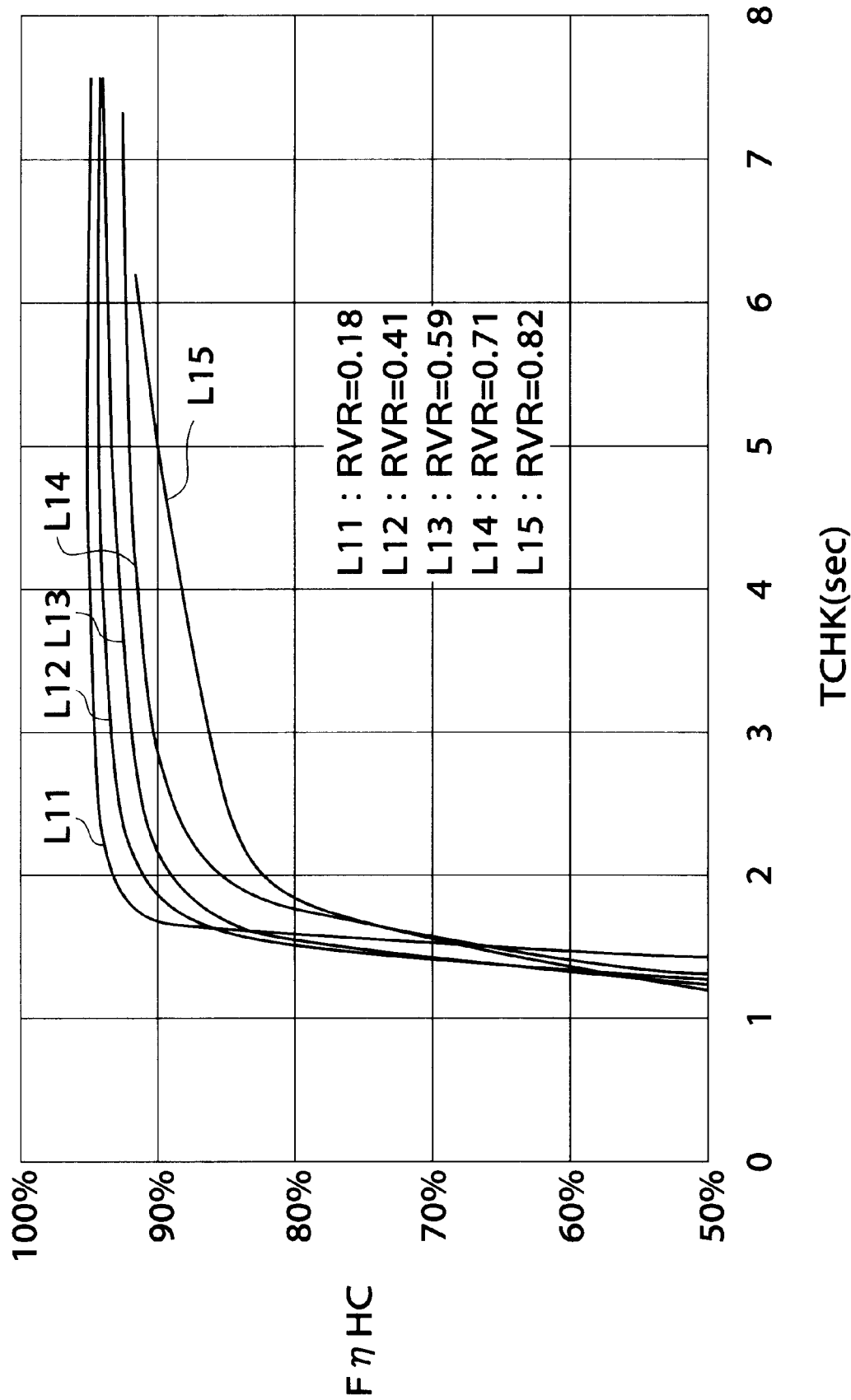

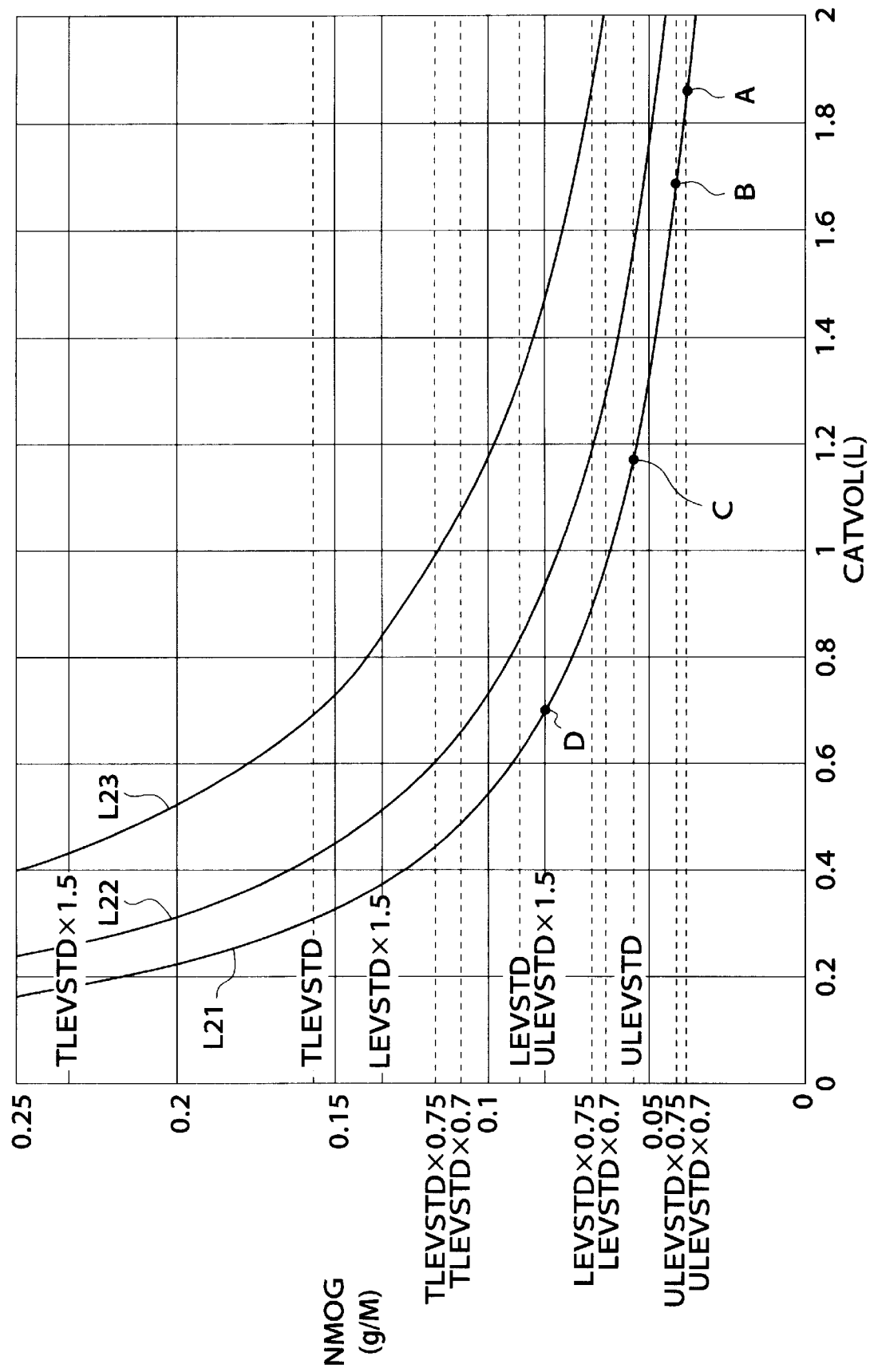

FIG.14

|   |   |   | NMOGEM(g/M) | CATVOL(L) | RVR |
|---|---|---|---|---|---|
| 1 | Pd (L21) | ULEV STD×1.5 | 0.0825 | 0.70 | |
|   |   | ULEV STD | 0.055 | 1.17 | min 0.38 |
|   |   | ULEV STD×0.75 | 0.04125 | 1.69 | max 0.69 |
|   |   | ULEV STD×0.7 | 0.0385 | 1.85 | |
| 2 | Pt/Pd/Rh (L23) | TLEV STD×1.5 | 0.234 | 0.44 | |
|   |   | TLEV STD | 0.156 | 0.70 | min 0.41 |
|   |   | TLEV STD×0.75 | 0.117 | 0.99 | max 0.71 |
|   |   | TLEV STD×0.7 | 0.1092 | 1.07 | |
| 3 | Pt/Pd/Rh (L23) | LEV STD×1.5 | 0.135 | 0.83 | |
|   |   | LEV STD | 0.09 | 1.35 | min 0.41 |
|   |   | LEV STD×0.75 | 0.0675 | 1.89 | max 0.71 |
|   |   | LEV STD×0.7 | 0.063 | 2.05 | |
| 4 | Pt/Pd (L22) | LEV STD×1.5 | 0.135 | 0.51 | |
|   |   | LEV STD | 0.09 | 0.84 | min 0.39 |
|   |   | LEV STD×0.75 | 0.0675 | 1.19 | max 0.7 |
|   |   | LEV STD×0.7 | 0.063 | 1.30 | |
| 5 | Pd (L21) | LEV STD×1.5 | 0.135 | 0.37 | |
|   |   | LEV STD | 0.09 | 0.62 | min 0.38 |
|   |   | LEV STD×0.75 | 0.0675 | 0.90 | max 0.69 |
|   |   | LEV STD×0.7 | 0.063 | 0.99 | |

CATALYST DETERIORATION-DETERMINING SYSTEM FOR INTERNAL COMBUSTION ENGINES

BACKGROUND OF THE INVENTION

1. Field of the Invention

This invention relates to a catalyst deterioration-determining system for internal combustion engines, which determines deterioration of a catalyst arranged in the exhaust system of the engine, for purifying exhaust gases emitted from the engine.

2. Prior Art

To determine deterioration of a catalyst provided in an internal combustion engine, which purifies exhaust gases emitted from the engine, a catalyst deterioration-determining method is conventionally known, for example, from Japanese Laid-Open Patent Publication (Kokai) No. 5-106494, which controls the air-fuel ratio of an air-fuel mixture supplied to the engine in a feedback manner responsive to an output from an oxygen concentration sensor arranged in the exhaust passage of the engine at a location downstream of a catalyst arranged in the same, measures an inversion period of the output from the oxygen concentration sensor, and determines whether or not the catalyst is deteriorated, based on the measured inversion period.

According to the conventional method, however, the determination of deterioration of the catalyst is carried out by comparing the measured inversion period as it is with a predetermined reference value without contemplating operating conditions of the engine at the measurement. As a result, the measured inversion period contains an error depending on operating conditions of the engine at the measurement. Therefore, the conventional method remains to be improved in the determination accuracy.

Further, according to the conventional method, it is difficult to determine the deterioration degree of the catalyst with high accuracy, and therefore the method still remains to be improved in order to satisfy stricter legal regulations of exhaust gases.

SUMMARY OF THE INVENTION

It is the object of the invention to provide a catalyst deterioration-determining system for internal combustion engines, which is capable of determining the deterioration degree of the catalyst with higher accuracy.

To attain the above object, according to a first aspect of the invention, there is provided a catalyst deterioration-determining system for an internal combustion engine having an exhaust system, catalyst means arranged in the exhaust system, for purifying exhaust gases emitted from the engine, oxygen concentration-detecting means arranged in the exhaust system at a location downstream of the catalyst means, for detecting concentration of oxygen present in the exhaust gases, and air-fuel ratio control means for controlling an air-fuel ratio of an air-fuel mixture supplied to the engine in a feedback manner in response to an output from the oxygen concentration-detecting means, the catalyst deterioration-determining system including catalyst deterioration-determining means for carrying out determination of deterioration of the catalyst means, based on the output from the oxygen concentration-detecting means during execution of air-fuel ratio feedback control by the air-fuel ratio control means, the catalyst deterioration-determining system being characterized by an improvement, wherein:

the catalyst deterioration-determining means includes measuring means for measuring an inversion period parameter representative of a repetition period of change in the output from the oxygen concentration-detecting means over a predetermined diagnosis period, and determination parameter-calculating means for calculating a determination parameter by averaging values of the inversion period parameter measured over different diagnosis periods as the predetermined diagnosis period by the measuring means, the catalyst deterioration-determining means carrying out the determination of deterioration of the catalyst means, based on the determination parameter.

Preferably, the catalyst deterioration-determining means carries out the deterioration determination by comparing the determination parameter with a first determination reference value, and changes the first determination reference value according to a number of times of measurement of the inversion period parameter.

More preferably, the catalyst deterioration-determining means changes the first determination reference value in a direction of making it more difficult to determine that the catalyst means is deteriorated, as the number of times of measurement of the inversion period parameter increases.

Further preferably, the catalyst deterioration-determining system further includes direct determining means for carrying out determination of deterioration of the catalyst means, based on the inversion period parameter.

Preferably, the direct determining means carries out the deterioration determination by comparing the inversion period parameter with a second determination reference value, and sets the second determination reference value to a value which makes it more difficult to determine that the catalyst means is deteriorated than the first determination reference value.

Preferably, the catalyst deterioration-determining means finally determines that the catalyst means is deteriorated when a frequency at which it is determined that the catalyst means is deteriorated exceeds a predetermined value.

Also preferably, the determination parameter is a moving average value of the inversion period parameter.

More preferably, the measuring means measures a first parameter representative of the repetition period of change in the output from the oxygen concentration-detecting means and a second parameter representative of a flow rate of exhaust gases emitted from the engine, and uses a combination of the measured first and second parameters as the inversion period parameter.

Advantageously, the predetermined diagnosis period is included in one operating period of the engine, the measuring means measuring the inversion period parameter once over the one operating period of the engine.

To attain the same object, according to a second aspect of the invention, there is provided a catalyst deterioration-determining system for an internal combustion engine having an exhaust system, catalyst means arranged in the exhaust system, for purifying exhaust gases emitted from the engine, oxygen concentration-detecting means arranged in the exhaust system at a location downstream of the catalyst means, for detecting concentration of oxygen present in the exhaust gases, and air-fuel ratio control means for controlling an air-fuel ratio of an air-fuel mixture supplied to the engine in a feedback manner in response to an output from the oxygen concentration-detecting means, the catalyst deterioration-determining system including catalyst deterioration-determining means for carrying out determination of deterioration of the catalyst means, based on the output from the oxygen concentration-detecting means during execution of air-fuel ratio feedback control by the air-fuel ratio control means, the catalyst deterioration-determining system being characterized by an improvement, wherein:

the catalyst deterioration-determining means includes first measuring means for measuring an inversion period parameter representative of a repetition period of change in the output from the oxygen concentration-detecting means over a predetermined diagnosis period, second measuring means for measuring an exhaust gas flow rate parameter representative of a flow rate of exhaust gases emitted from the engine, first determination parameter-calculating means for calculating a first determination parameter, based on the inversion period parameter and the exhaust gas flow rate parameter measured by the first and second measuring means, and second determination parameter-calculating means for calculating a second determination parameter by averaging the first determination parameter calculated over different diagnosis periods as the predetermined diagnosis period by the first determination parameter-calculating means, the catalyst deterioration-determining means carrying out the determination of deterioration of the catalyst means, based on the first and second determination parameters.

To attain the same object, according to a third aspect of the invention, there is provided a catalyst deterioration-determining system for an internal combustion engine having an exhaust system, catalyst means arranged in the exhaust system, for purifying exhaust gases emitted from the engine, oxygen concentration-detecting means arranged in the exhaust system at a location downstream of the catalyst means, for detecting concentration of oxygen present in the exhaust gases, and air-fuel ratio control means for controlling an air-fuel ratio of an air-fuel mixture supplied to the engine in a feedback manner in response to an output from the oxygen concentration-detecting means, the catalyst deterioration-determining system including catalyst deterioration-determining means for carrying out determination of deterioration of the catalyst means, based on the output from the oxygen concentration-detecting means during execution of air-fuel ratio feedback control by the air-fuel ratio control means, the catalyst deterioration-determining system being characterized by an improvement, wherein:

the catalyst deterioration-determining means includes measuring means for measuring an inversion period parameter representative of a repetition period of change in the output from the oxygen concentration-detecting means over a predetermined diagnosis period, average value-calculating means for calculating an average value of values of the inversion period parameter measured by the measuring means over different diagnosis periods as the predetermined diagnosis period, standard deviation-calculating means for calculating a standard deviation of the inversion period parameter, and deterioration index-updating means for updating a deterioration index representative of a central value of the inversion period parameter when the average value calculated by the average value-calculating means exceeds a monitoring region corresponding to the standard deviation calculated by the standard deviation-calculating means, the catalyst deterioration-determining means carrying out the determination of deterioration of the catalyst means, based on the updated deterioration index.

Preferably, the standard deviation-calculating means calculates the standard deviation of the inversion period parameter, based on an average value of a difference between the inversion period parameter and the average value thereof.

More preferably, the catalyst deterioration-determining system includes monitoring region-updating means for updating the monitoring region, based on the deterioration index updated by the deterioration index-updating means.

Advantageously, the deterioration index-updating means updates the deterioration index by multiplying a difference between the average value calculated by the average value-calculating means and the deterioration index by a predetermined coefficient, and adding a resulting product to the deterioration index, the predetermined coefficient being set to a value smaller than 1.

Preferably, the average value-calculating means calculates the average value of the inversion period parameter by a moving average method.

Also preferably, the measuring means measures a first parameter representative of the repetition period of change in the output from the oxygen concentration-detecting means and a second parameter representative of a flow rate of exhaust gases emitted from the engine, and uses a combination of the measured first and second parameters as the inversion period parameter.

Advantageously, the predetermined diagnosis period is included in one operating period of the engine, the measuring means measuring the inversion period parameter once over the one operating period of the engine.

To attain the same object, according to a fourth aspect of the invention, there is provided a catalyst deterioration-determining system for an internal combustion engine having an exhaust system, catalyst means arranged in the exhaust system, for purifying exhaust gases emitted from the engine, oxygen concentration-detecting means for detecting concentration of oxygen present in exhaust gases having passed through the catalyst means, and air-fuel ratio control means for controlling an air-fuel ratio of an air-fuel mixture supplied to the engine in a feedback manner in response to an output from the oxygen concentration-detecting means, the catalyst deterioration-determining system including catalyst deterioration-determining means for carrying out determination of deterioration of the catalyst means, based on the output from the oxygen concentration-detecting means during execution of air-fuel ratio feedback control by the air-fuel ratio control means, the catalyst deterioration-determining system being characterized by an improvement, wherein:

the catalyst means comprises first and second catalysts, an upstream storage section storing the first catalyst, and a downstream storage section storing the second catalyst;

the oxygen concentration-detecting means being arranged in the exhaust system at a location between the upstream storage section and the downstream storage section;

the deterioration-determining means determining a degree of deterioration of the catalyst means as a whole, based on a degree of deterioration of the first catalyst stored in the upstream storage section.

Preferably, the upstream storage section has a capacity thereof set to 30% to 60% of a whole capacity of the upstream storage section and the downstream storage section.

More preferably, the upstream storage section and the downstream storage section of the catalyst means are accommodated in a single container.

The above and other objects, features, and advantages of the invention will become more apparent from the following detailed description taken in conjunction with the accompanying drawings.

BRIEF DESCRIPTION OF THE DRAWINGS

FIGS. 6A to 6B collectively form a timing chart which is useful in explaining a manner of calculating the air-fuel ratio correction coefficient KO2, wherein:

FIG. 6A shows changes in the KO2 value; and

FIG. 6B shows changes in the output from the SVO2 value;

FIG. 11 is a graph showing the relationship between the capacity ratio RVR and a deterioration-determining parameter TCHK;

FIG. 12 is a graph showing the relationship between the deterioration-determining parameter TCHK and the purification rate FηHC by a catalyst stored in the upstream storage section of the exhaust gas-purifying device;

FIG. 13 is a graph showing the relationship between the capacity of the catalyst and an emission amount of NMOG;

FIG. 14 is a graph showing results of calculations of maximum values and minimum values of the capacity ratio RVR, depending on the type of the catalyst employed;

DETAILED DESCRIPTION

The invention will now be described in detail with reference to the drawings showing embodiments thereof.

Figure 1:
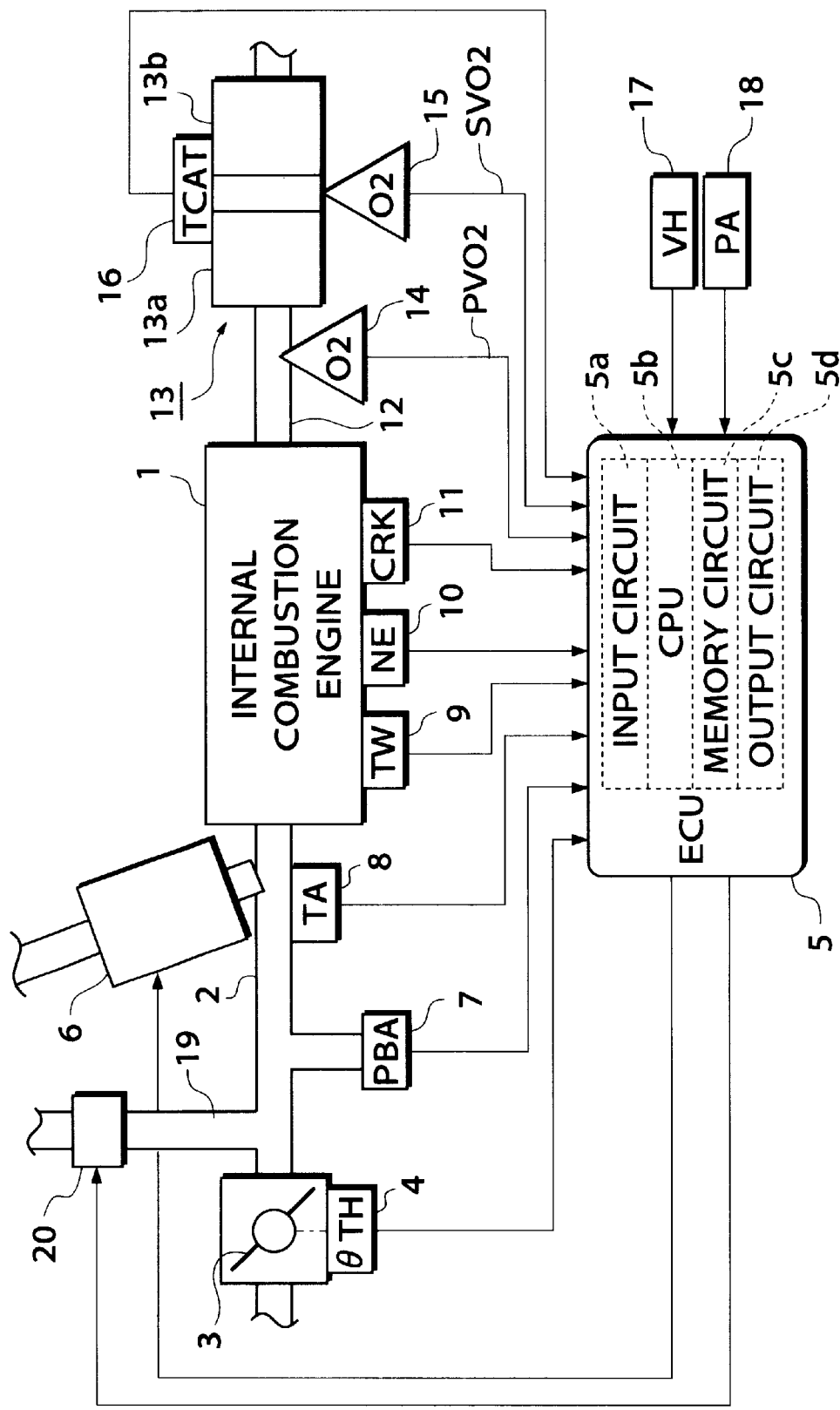
FIG. 1 is a block diagram schematically showing the whole arrangement of an internal combustion engine and a catalyst deterioration-determining system therefor, according to an embodiment of the invention.

Referring first to FIG. 1, there is schematically illustrated the whole arrangement of an internal combustion engine and a catalyst deterioration-determining system therefor, according to an embodiment of the invention. In the figure, reference numeral 1 designates an internal combustion engine having four cylinders (hereinafter simply referred to as "the engine"). Connected to the cylinder block of the engine 1 is an intake pipe 2 in which is arranged a throttle valve 3. A throttle valve opening (θTH) sensor 4 is connected to the throttle valve 3, for generating an electric signal indicative of the sensed throttle valve opening θTH and supplying the same to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

Further, an intake pipe absolute pressure (PBA) sensor 7 is provided in communication with the interior of the intake pipe 2, at a location immediately downstream of the throttle valve 3, for supplying an electric signal indicative of the sensed absolute pressure within the intake pipe 2 to the ECU 5. An intake air temperature (TA) sensor 8 is inserted into the interior of the intake pipe 2 at a location downstream of the PBA sensor 7, for supplying an electric signal indicative of the sensed intake air temperature TA to the ECU 5.

An engine coolant temperature (TW) sensor 9 formed of a thermistor or the like is mounted in the cylinder block, for supplying an electric signal indicative of the sensed engine coolant temperature TW to the ECU 5. An engine rotational speed (NE) sensor 10 and a CRK sensor 11 are arranged in facing relation to a camshaft or a crankshaft of the engine 1, neither of which is shown. The NE sensor 10 generates a pulse as a TDC signal pulse at each of predetermined crank angles whenever the crankshaft rotates through 180 degrees, and supplies the same to the ECU 5. The CRK sensor 11 generates a pulse as a CRK signal pulse at each of predetermined crank angles whenever the crankshaft rotates through 45 degrees, and supplies the same to the ECU 5.

An exhaust gas-purifying device (catalyst means) 13 is arranged in an exhaust pipe 12 connected to the cylinder block of the engine 1, for purifying exhaust gases emitted from the engine. The exhaust gas-purifying device 13 is comprised of an upstream storage section 13a and a downstream storage section 13b both storing respective catalysts for purifying exhaust gases and accommodated in a single container. An upstream O2 sensor 14 as oxygen concentration-detecting means is arranged in the exhaust pipe 12 at a location upstream of the exhaust gas-purifying device 13, and a downstream O2 sensor 15 as oxygen concentration-detecting means is arranged in the exhaust gas-purifying device 13 at a location between the upstream and downstream storage sections 13a and 13b. The O2 sensors 14 and 15 both detect the concentration of oxygen present in exhaust gases, and supply signals indicative of the sensed oxygen concentration values (PVO2 and SVO2) to the ECU 5. Further, a catalyst temperature (TCAT) sensor 16 is connected to the exhaust gas-purifying device 13 at a location between the upstream storage section 13a and the downstream storage section 13b, for supplying an electric signal indicative of the sensed TCAT value to the ECU 5.

The arrangement of the downstream O2 sensor 15 at the location between the upstream storage section 13a and the downstream storage section 13b can bring about the following advantages: That is, the catalyst stored in the downstream storage section 13b can be free from abnormal deterioration caused by irregular combustion or poisoning by virtue of the presence of the upstream storage section 13a, and therefore the downstream storage section 13b is expected to be deteriorated only due to normal aging. Accordingly, by monitoring deterioration of the catalyst stored in the upstream storage section 13a, the deterioration degree of the whole catalyst of the exhaust gas-purifying device 13 can be determined. Further, the deterioration of the catalyst in the upstream storage section 13a advances more rapidly than the deterioration of the catalyst in the downstream storage section 13b, and therefore, for example, deterioration by 2% of the purifying performance of the whole device can be detected from a determination of deterioration by approximately 20% of the catalyst stored in the upstream storage section 13a. As a result, the deterioration degree of the whole catalyst of the exhaust gas-purifying device 13 can be determined more accurately. Further, by virtue of the accommodation of the upstream storage section 13a and the downstream storage section 13b of the exhaust gas purifying-device 13 in the single container, the storage sections 13a and 13b are both disposed under a similar temperature condition, etc., to thereby enhance the accuracy of the deterioration degree of the whole catalyst.

Alternatively, the downstream O2 sensor 15 may be arranged downstream of the downstream storage section 13b.

Further electrically connected to the ECU 5 are a vehicle speed (VH) sensor 17 for detecting the vehicle speed VH of a vehicle in which the engine 1 is installed, and an atmospheric pressure (PA) sensor 18 for detecting the atmospheric pressure PA. Electric signals indicative of the sensed vehicle speed VH and atmospheric pressure PA are supplied to the ECU 5.

A purge control valve 20 is arranged in a passage 19 via which a canister, not shown, for adsorbing evaporative fuel generated in a fuel tank, not shown, is connected to the intake pipe 2. The purge control valve 20 is electrically connected to the ECU 5 to have its opening/closing operation controlled by a signal therefrom. The purge control valve 20 is opened when the engine 1 is in a predetermined operating condition to supply evaporative fuel stored in the canister into the intake pipe 2.

The ECU 5 is comprised of an input circuit 5a having the functions of shaping the waveforms of input signals from various sensors including ones mentioned above, shifting the voltage levels of sensor output signals to a predetermined level, converting analog signals from analog-output sensors to digital signals, and so forth, a central processing unit (hereinafter referred to as the "the CPU") 5b, a memory circuit 5c storing various operational programs which are executed by the CPU 5b, and for storing results of calculations therefrom, etc., and an output circuit 5d which outputs driving signals to the fuel injection valves 6, etc.

The CPU 5b operates in response to the above-mentioned various engine parameter signals from the various sensors to determine operating conditions in which the engine 1 is operating, such as an air-fuel ratio feedback control region where the air-fuel ratio is controlled in response to the oxygen concentration in the exhaust gases, and open-loop control regions other than the air-fuel ratio feedback control region, and calculates, based upon the determined engine operating conditions, a fuel injection period Tout over which the fuel injection valves 6 are to be opened by the use of the following equation (1), in synchronism with generation of TDC signal pulses:

$$TOUT = TIM \times KO2 \times K1 + K2 \tag{1}$$

where TIM represents a basic value of the fuel injection period TOUT of the fuel injection valves 6, which is read from a TIM map determined according to the engine rotational speed NE and the intake pipe absolute pressure PBA. The TIM map is set such that map values are read according to the NE and PBA values so as to control the air-fuel ratio of an air-fuel mixture supplied to the engine to a value substantially equal to a stoichiometric air-fuel ratio. The basic fuel injection period TIM assumes a value almost proportional to the amount of intake air supplied to the engine (weight flow).

KO2 represents an air-fuel ratio correction coefficient (hereinafter referred to simply as "the correction coefficient"), which is determined based on the concentration of oxygen present in exhaust gases detected by the O2 sensors 14 and 15 when the engine 1 is operating in the air-fuel ratio feedback control region, while it is set to predetermined values corresponding to respective open-loop control regions of the engine when the engine 1 is in the open-loop control regions.

K1 and K2 represent other correction coefficients and correction variables, respectively, which are set according to engine operating parameters to such values as optimize operating characteristics of the engine, such as fuel consumption and engine accelerability.

The CPU 5b supplies a driving signal to the fuel injection valves 6 via the output circuit 5d, for opening the same, based on the fuel injection period TOUT obtained by the above calculation, and controls the valving operation of the purge control valve 20, based on the determined engine operating conditions.

Next, a manner of determining deterioration (deterioration monitoring) of the catalyst stored in the exhaust gas-purifying device 13 will be described.

Air-fuel ratio feedback control for deterioration monitoring of the catalyst stored in the exhaust gas-purifying device 13 is carried out based on the output SVO2 from the downstream O2 sensor 15 alone. Further, a measurement is made of a time period TL from the time the output SVO2 is inverted from a leaner side to a richer side with respect to a predetermined reference voltage SVREF to the time the output SVO2 is inverted in an opposite direction to the above, and a time period TR from the time the output SVO2 is inverted from the richer side to the leaner side with respect to the reference voltage SVREF to the time the output SVO2 is inverted in an opposite direction to the above. Deterioration of the catalyst in the exhaust gas-purifying device 13 is determined based on the thus measured TL and TR time periods (see FIGS. 6A and 6B).

Figure 2:
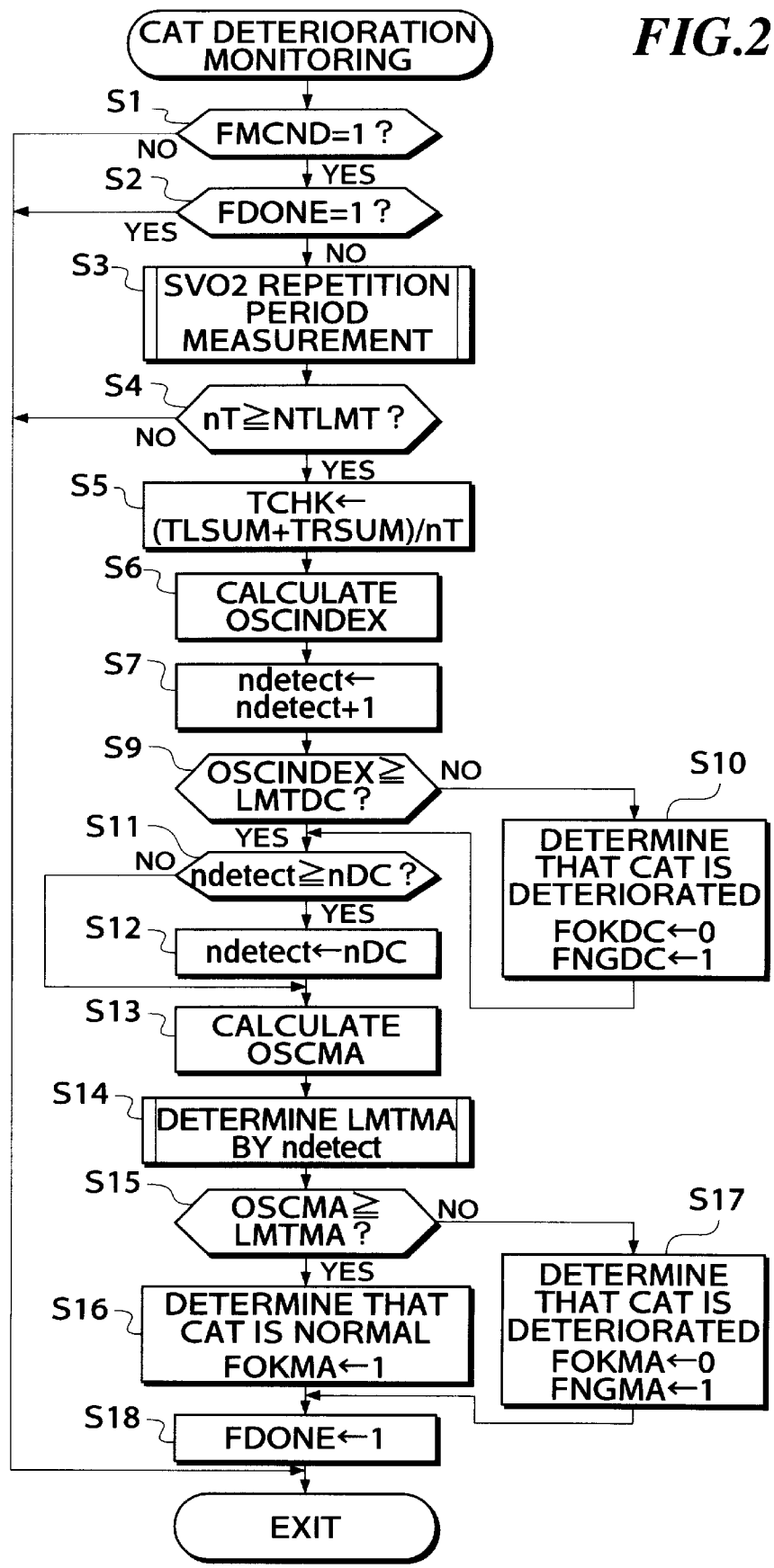
FIG. 2 is a flowchart showing a main routine for carrying out catalyst deterioration determination.

FIG. 2 shows a main routine for carrying out the catalyst deterioration monitoring, which is executed by the CPU 5b at predetermined time intervals (e.g. 10 msec).

First, at a step S1, it is determined whether or not a precondition flag FMCND which, when set to "1", indicates that preconditions for executing the deterioration monitoring (hereinafter referred to as "the preconditions") are satisfied, is equal to "1". If FMCND=0 holds, the program is immediately terminated.

Figure 3:
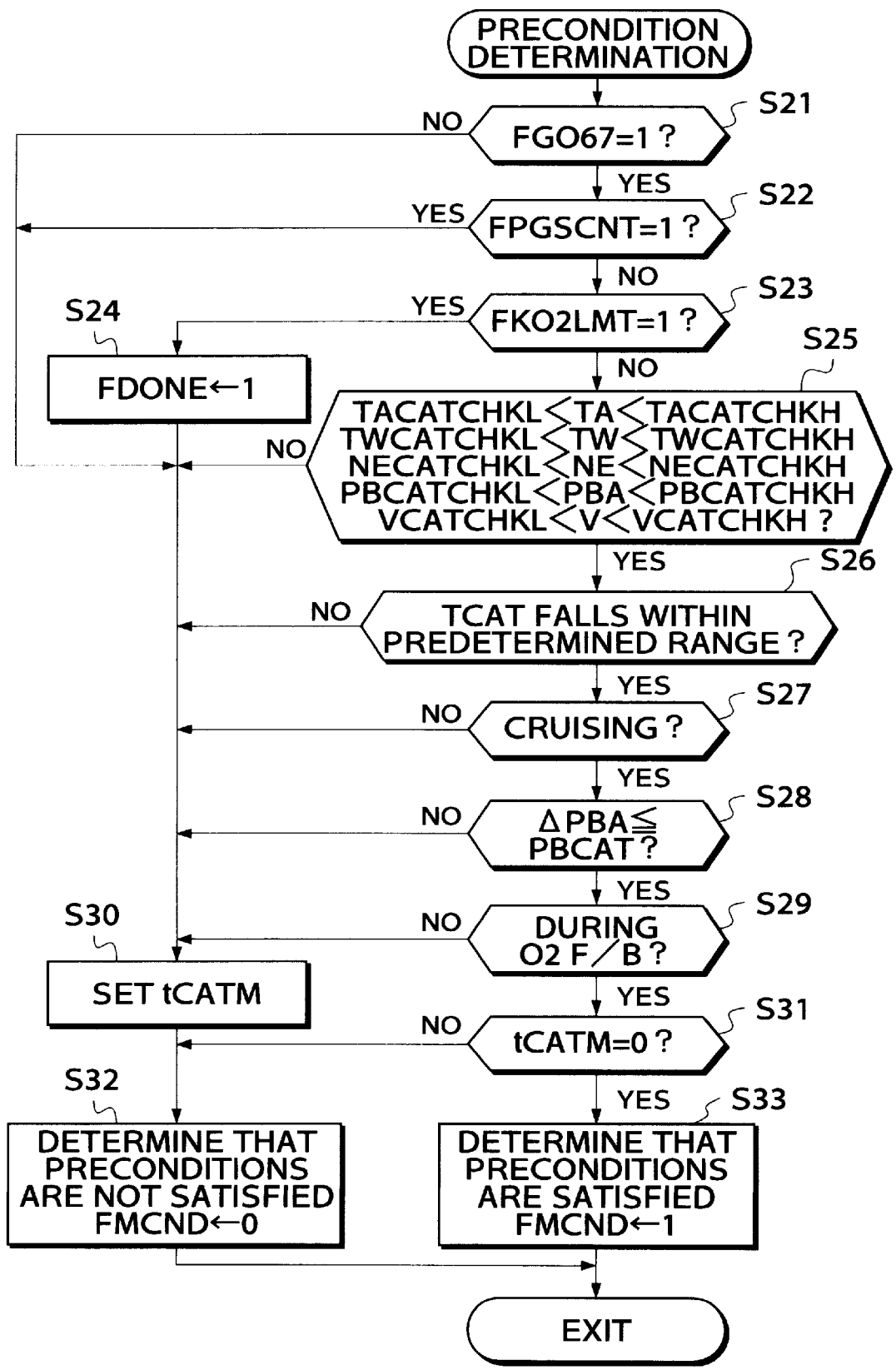
FIG. 3 is a flowchart showing a subroutine for determining whether or not preconditions for carrying out the catalyst deterioration determination are satisfied, which is executed at a step S1 in FIG. 2.

A precondition-determining process (process for setting the precondition flag FMCND) will now be described with reference to FIG. 3.

First, it is determined at a step S21 whether or not a monitoring permission flag FGO67 is equal to "1". The flag FGO67 is set to "0" e.g. during execution of monitoring other than the catalyst deterioration monitoring, such as an O2 sensor deterioration monitoring, an evaporative emission control system failure monitoring, and a fuel supply system abnormality monitoring, and to "1" when these monitorings other than the catalyst deterioration monitoring are not being executed. If the flag FGO67 is equal to "0", which means that some other monitoring is being executed, a timer tCATM is set to a predetermined time period TCATM and started at a step S30, and it is determined at a step S32 that the monitoring preconditions are not fulfilled.

If the flag FGO67 is equal to "1" and hence the catalyst deterioration monitoring is permitted, it is determined at a step S22 whether or not a purging cut flag FPGSCNT is equal to "1". The purging cut flag FPGSCNT, when set to "1", indicates that the engine is in a condition in which purging of evaporative fuel from the canister into the intake pipe 2 should be inhibited. If FPGSCNT=1 holds and hence the purging of evaporative fuel should be inhibited, the program proceeds to the steps S30 and S32, determining that the monitoring preconditions are not fulfilled. If FPGCNT=0 holds at the step S22, it is determined at a step S23 whether or not a limit flag FKO2LMT is equal to "1". The limit flag FKO2LMT, when set to "1", indicates that the correction coefficient KO2 has been held at a predetermined upper or lower limit value over a predetermined time period (in a held-to-KO2 limit state).

If FKO2LMT=1 holds and hence the correction coefficient KO2 is in the held-to-KO2 limit state, a completion flag FDONE which, when set to "1", indicates that the catalyst deterioration monitoring has been completed, is set to "1" at a step S24, followed by the program proceeding to the step S30.

If FKO2LMT=0 holds and hence the correction coefficient KO2 is not in the held-to-KO2 limit state, it is further determined at a step S25 whether or not the intake air temperature TA is within a range defined by a predetermined upper limit value TACATCHKH (e.g. 100° C.) and a predetermined lower limit value TACATCHKL (e.g. −0.2° C.), whether or not the engine coolant temperature TW is within a range defined by a predetermined upper limit value TWCATCHKH (e.g. 100° C.) and a predetermined lower limit value TWCATCHKL(e.g. 80° C.), whether or not the engine rotational speed NE is within a range defined by a predetermined upper limit value NECATCHKH (e.g. 3500 rpm) and a predetermined lower limit value NECATCHKL (e.g. 1000 rpm), whether or not the intake pipe absolute pressure PBA is within a range defined by a predetermined upper limit value PBCATCHKH (e.g. 510 mmHg) and a predetermined lower limit value PBCATCHKL (e.g. 300 mmHg), and whether or not the vehicle speed VH is within a range defined by a predetermined upper limit value VHCATCHKH (e.g. 80 km/h) and a predetermined lower limit value VHCATCHKL (e.g. 32 km/h). If these engine operating parameters are all within the above respective ranges, it is further determined at a step S26 whether or not the catalyst temperature TCAT of the exhaust gas-purifying device 13 is within a predetermined range (of e.g. 350° C. to 800° C.). In the present embodiment, the catalyst temperature TCAT is detected by the catalyst temperature sensor 16, but a temperature value estimated from engine operating parameters may be used, instead.

If the catalyst temperature TCAT is within the predetermined range, it is further determined at a step S27 whether or not the vehicle is cruising. This determination is carried out e.g. by determining whether or not the variation in the vehicle speed VH has continually been below 0.8 km/h per sec. over a predetermined time period (e.g. 2 sec). If the vehicle is cruising, it is determined at a step S28 whether or not the intake pipe absolute pressure PBA has an amount of variation ΔPBA (e.g. over 5 msec.) which is below a predetermined value PBCAT (e.g. 16 mmHg). If the amount of variation ΔPBA is below the predetermined value PBCAT, it is further determined at a step S29 whether or not the air-fuel ratio feedback control responsive to the output PVO2 from the upstream O2 sensor 14 is being executed.

If any of the answers to the questions of the steps S25 to S29 is negative (NO), the program proceeds to the step S30, whereas if all the answers are affirmative (YES), i.e. if the engine is in a predetermined condition for carrying out the catalyst monitoring, it is determined at a step S31 whether or not the count value of the down-counting timer tCATM which has been set and started at the step S30 is equal to "0". When this question is first made, tCATM>0 holds, and hence the monitoring preconditions are not determined to be fulfilled (at the step S32). The monitoring preconditions are fulfilled only after the engine has been in the above-mentioned predetermined condition over the predetermined time period TCATM (e.g. 5 sec), and then the precondition flag FMCND is set to "1" at a step S33, followed by terminating the present routine.

Referring again to FIG. 2, if FMCND=1 holds, i.e. if the preconditions are satisfied, then it is determined at a step S2 whether or not the completion flag FDONE is equal to "1". If FDONE=1 holds, the program is immediately terminated, whereas if FDONE=0 holds, an SVO2 repetition period-measuring process is executed at a step S3.

Figure 4:
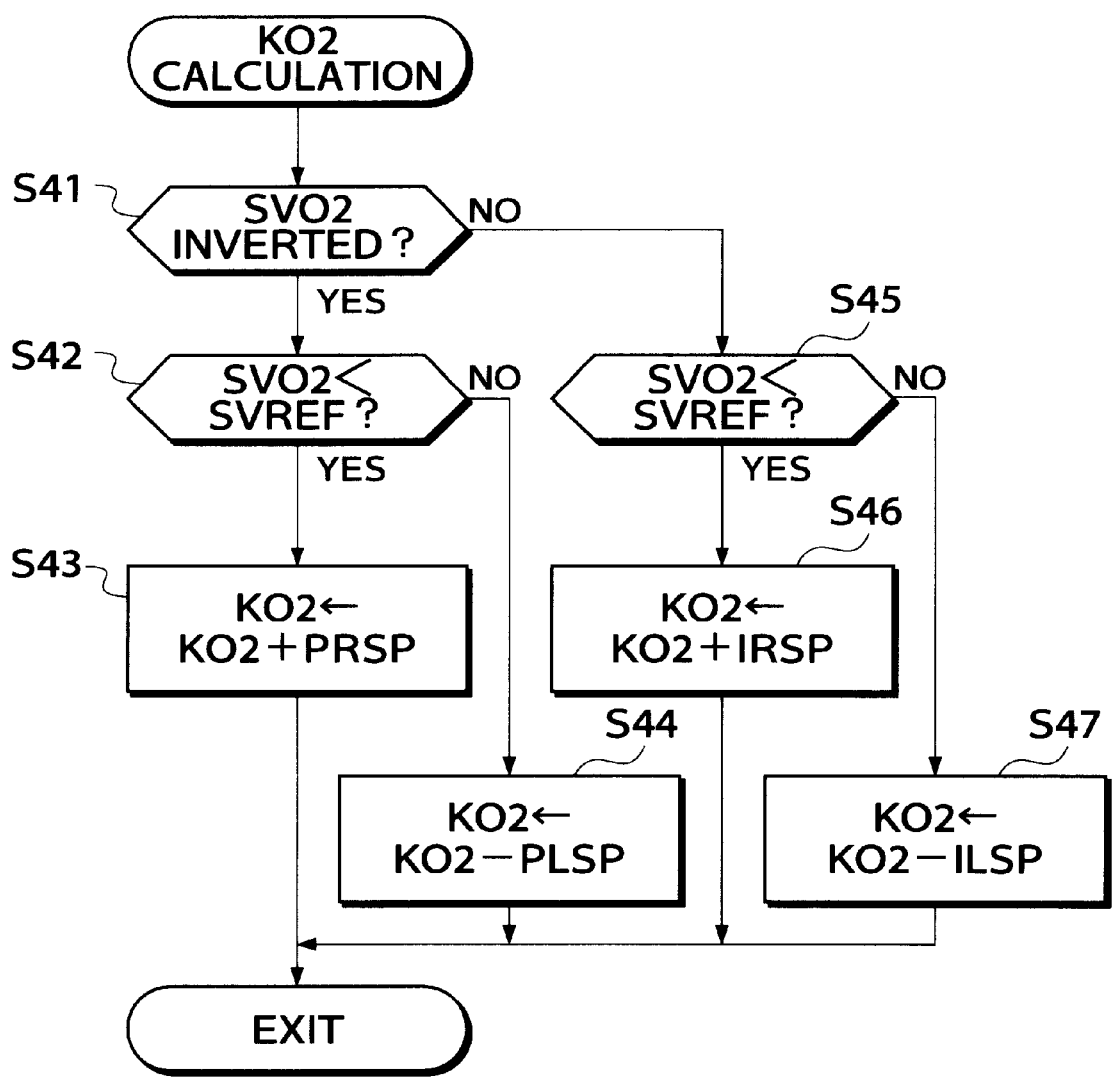
FIG. 4 is a flowchart showing a subroutine for calculating an air-fuel ratio correction coefficient KO2 during the catalyst deterioration determination.
Figure 5:
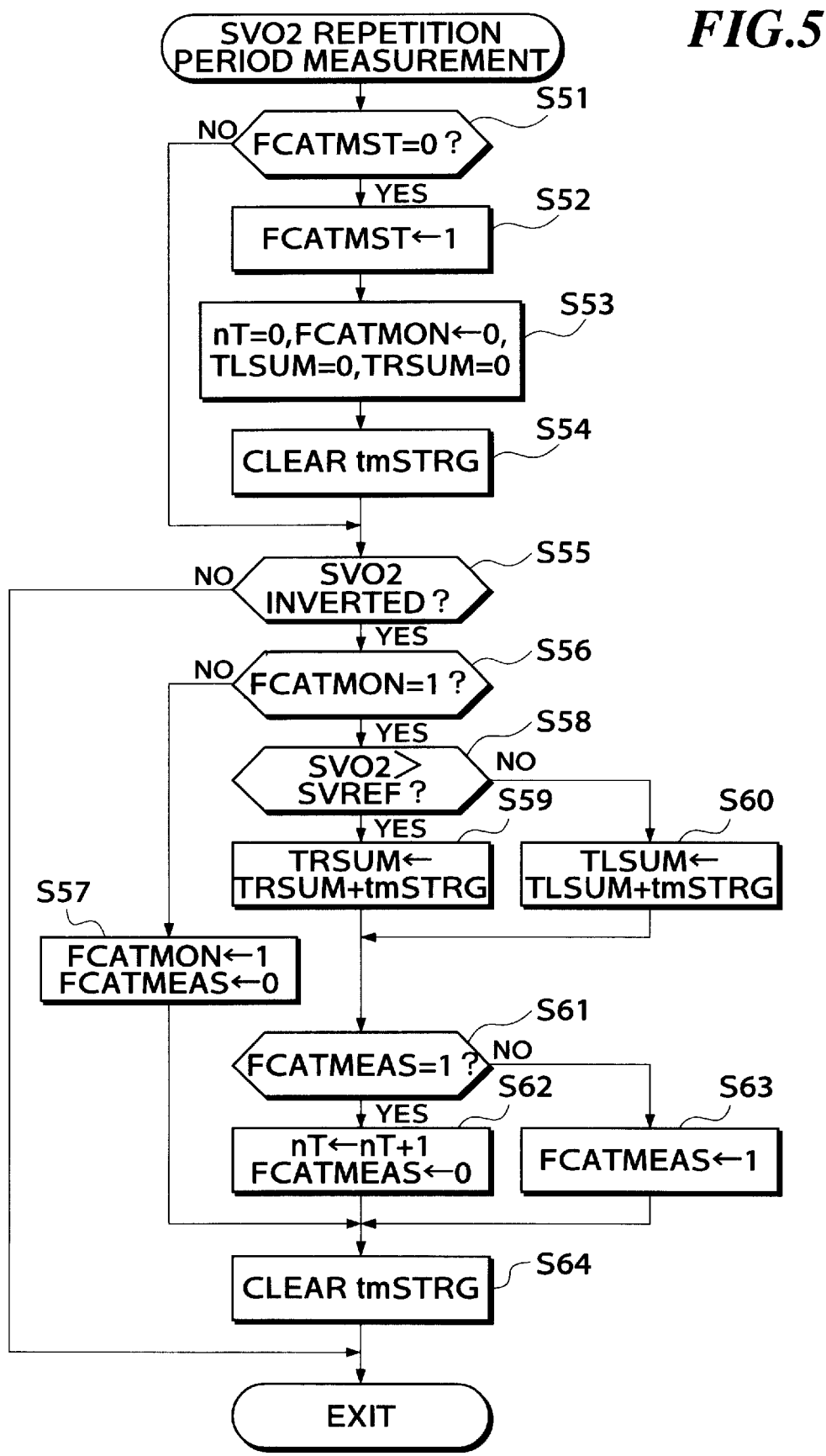
FIG. 5 is a flowchart showing a subroutine for measuring an inversion period of an output SVO2 from a downstream O2 sensor, which is executed at a step S3 in FIG. 2.

FIG. 5 shows a subroutine for carrying out the inversion period-measuring process. If FMCND=1 and FDONE=0 hold at the respective steps S1 and S2 in FIG. 2, the air-fuel ratio correction coefficient KO2 is calculated based on the output SVO2 from the downstream O2 sensor 15 to carry out the air-fuel ratio feedback control. Therefore, a manner of calculating the KO2 value will first be described with reference to FIG. 4.

At a step S41 in FIG. 4, it is determined whether or not the relationship in value between the output SVO2 and the reference voltage SVREF has been inverted. If the relationship has been inverted, proportional control is carried out. That is, it is determined at a step S42 whether or not the output SVO2 is lower than the reference voltage SVREF. If SVO2<SVREF holds, a rich-side special P term PRSP is added to an immediately preceding value of the KO2 value at a step S43. On the other hand, if SVO2≧SVREF holds, a lean-side special P term PLSP is subtracted from the immediately preceding value of the KO2 value at a step S44.

If the answer to the question of the step S41 is negative (NO), integral control is carried out. That is, it is determined at a step S45 whether or not the output SVO2 is lower than the reference voltage SVREF. If SVO2<SVREF holds, a special I term IRSP is added to an immediately preceding value of the KO2 value at a step S46. On the other hand, if SVO2≧SVREF holds, a special I term ILSP is subtracted from the immediately preceding value of the KO2 value at a step S47.

Figure 6:
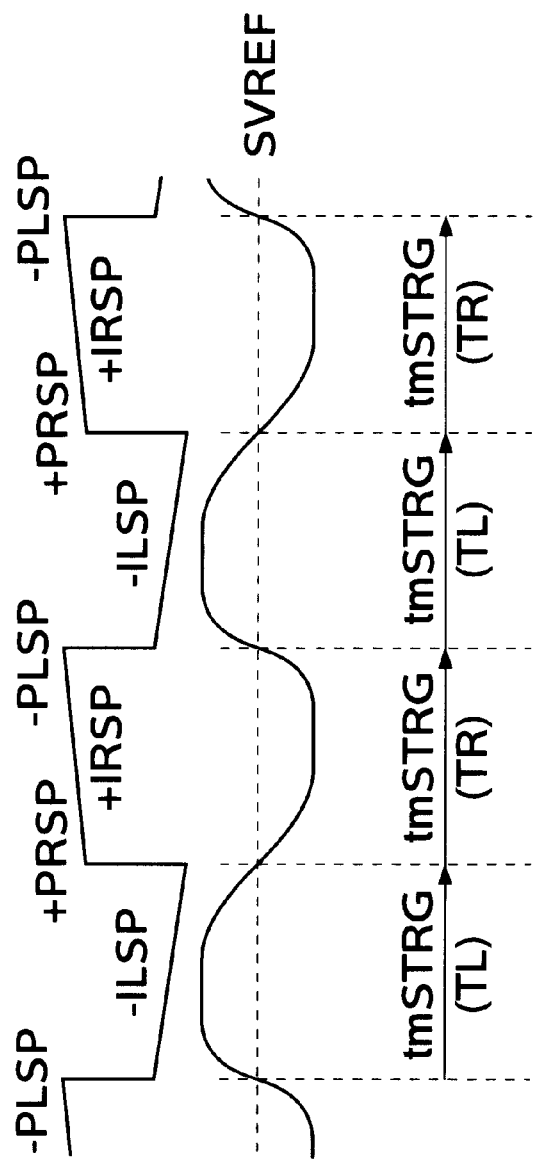

By executing the FIG. 4 process, the correction coefficient KO2 is periodically changed in response to the downstream O2 sensor output SVO2, as shown in FIGS. 6A and 6B. The inversion period of the sensor output SVO2 will be referred to hereinafter as "the SVO2 repetition period".

Next, the SVO2 repetition period-measuring process will be described with reference to FIG. 5.

First, at a step S51, it is determined whether or not an initialization flag FCATMST which, when set to "0", indicates that the present program is executed for the first time, is equal to "0". When this question is first made, FCATMST=0 holds, and then the program proceeds to a step S52, wherein the flag FCATMST is set to "1". Then, at a step S53, various parameters are initialized. More specifically, a counter nT for counting the number of times of measurement of the inversion period, a measurement-starting flag FCATMON which, when set to "1", indicates that the measurement of the inversion period has been started, an integrated value TLSUM of the time period TL, and an integrated value TRSUM of the time period TR are all set to "0". At the following step S54, an inversion period-measuring up-counting timer tmSTRG is set to "0", followed by the program proceeding to a step S55.

When the step S51 is executed in the following loop, FCATMST=1 holds, and therefore the program jumps from the step S51 to the step S55.

At the step S55, it is determined whether or not the relationship in value between the downstream O2 sensor output SVO2 and the reference voltage SVREF has been inverted, and if the relationship has not been inverted, the program is immediately terminated. On the other hand, if it has been inverted, it is determined at a step S56 whether or not the measurement-starting flag FCATMON is equal to "I". When this question is first made, FCATMON=0 holds, and then the flag FCATMON is set to "1" and a measurement-supervising flag FCATMEAS is set to "0" at a step S57, followed by the program proceeding to a step S64. The measurement-supervising flag FCATMEAS is provided for executing measurement of the time periods TL and TR an even number of times regardless of whether the first measurement is started with measurement of the time period TL or the time period TR (i.e. for executing measurement of the integrated value TRSUM the same number of times as that of measurement of the integrated value TLSUM). At the step S64, the timer tmSTRG is set to "0", followed by terminating the present routine.

On the other hand, if FCATMON=1 holds at the step S56, it is determined at a step S58 whether or not the output SVO2 is higher than the reference voltage SVREF. If SVO2>SVREF holds, the count value of the timer tmSTRG is added to an immediately preceding value of the integrated value TRSUM to obtain a present value of the integrated value TRSUM at a step S59, followed by the program proceeding to a step S61. On the other hand, if SVO2≦SVREF holds, the count value of the timer tmSTRG is subtracted from the immediately preceding value of the integrated value TRSUM to obtain the present value of the integrated value TRSUM at a step S60, followed by the program proceeding to the step S61. The count value of the timer tmSTRG immediately after inversion of the output SVO2 is equal to the time period TL or TR, as shown in FIG. 6B, and therefore a value (TRSUM+TLSUM) is equal to an integrated value of the SVO2 repetition period (inversion period of the sensor output).

At the step S61, it is determined whether or not the measurement-supervising flag FCATMEAS is equal to "1". When this question is first made, FCATMEAS=0 holds, and then the flag FCATMEAS is set to "1" at a step S63, followed by the program proceeding to the step S64. On the other hand, if FCATMEAS=1 holds and hence the execution of the measurement in the present loop is an even-number-th execution of the measurement, the count value of the counter nT is incremented by "1" and the flag FCATMEAS is set to "0" at a step S62, followed by the program proceeding to the step S64.

Referring again to FIG. 2, at a step S4, it is determined whether or not the count value of the counter nT, i.e. the number of times of measurement of the inversion period is larger than a predetermined value NTLMT (e.g. 3). So long as nT<NTLMT holds, the program is immediately terminated. Thus, the SVO2 repetition period-measuring process is repeatedly executed until nT=NTLMT holds, and then the program proceeds to a step S5.

At the step S5, a determination time period TCHK is calculated, which is an average value of the SVO2 repetition period measured the number of times NTLMT, by the use of the following equation (2). The predetermined value NTLMT may be alternatively set to "1", and if it is so set, the determination time period TCHK is just equal to the measured SVO2 repetition period:

$$TCHK=(TLSUM+TRSUM)/nT \qquad (2)$$

In the present embodiment, the determination time period TCHK is employed as a parameter representative of the inversion period of the output from the oxygen concentration-detecting means.

At the following step S6, a first determination parameter OSCINDEX is calculated, which is representative of the oxygen storage capacity of the catalyst (stored in the upstream storage section 13$a$) by the use of the following equation (3). The thus calculated parameter OSCINDEX is stored in a ring buffer backed up by a battery of the engine to prevent the stored content therein from being erased even when an ignition switch of the engine, not shown, is turned off:

$$OSCINDEX=TCHK \times GAIRSUM \qquad (3)$$

where GAIRSUM represents an integrated value of a parameter representative of a flow rate of exhaust gases obtained during measurement of the SVO2 repetition period (hereinafter referred to as "the flow rate integrated value"). The GAIRSUM value is calculated by a program of FIG. 7, which is executed in synchronism with generation of TDC signal pulses.

Figure 7:
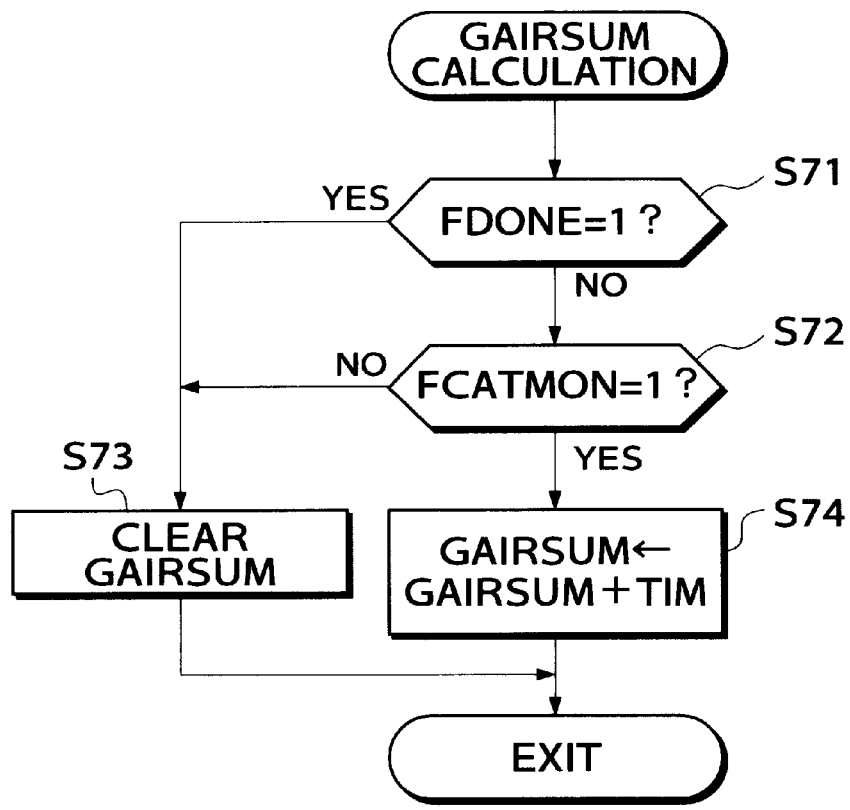
FIG. 7 is a flowchart showing a subroutine for calculating an integrated value GAIRSUM of a parameter representative of a flow rate of exhaust gases, which is used at a step S6 in FIG. 2.

First, at a step S71 in FIG. 7, it is determined whether or not the completion flag FDONE is equal to "1". If FDONE=0 holds, then it is determined at a step S72 whether or not the measurement-starting flag FCATMON is equal to "1". If FDONE=1 holds, which means that the catalyst deterioration-monitoring has been completed, or if FCATMON=0 holds, which means that the SVO2 repetition period measurement has not been started, the flow rate integrated value GAIRSUM is set to "0" at a step S73, followed by terminating the present routine.

On the other hand, if FDONE=0 and FCATMON=1 both hold, the flow rate integrated value GAIRSUSM is calculated at a step S74, by the use of the following equation (4):

$$GAIRSUM = GAIRSUM + TIM \quad (4)$$

where GAIRSUM on the right side represents an immediately preceding value of the GAIRSUM value, and TIM the basic value of the fuel injection period TOUT in the equation (1). As mentioned above, the basic value TIM assumes a value almost proportional to the intake air amount which in turn is almost equal to the exhaust gas flow rate, and therefore the TIM value is employed as the parameter representative of the exhaust gas flow rate. As a result, a parameter corresponding to the integrated value of the exhaust gas flow rate can be obtained without using an intake air amount sensor or an exhaust gas flow rate sensor.

By multiplying the determination time period TCHK by the thus calculated flow rate integrated value GAIRSUM, the first determination parameter OSCINDEX is obtained, and then a determination as to the catalyst deterioration is carried out by the use of the thus obtained first determination parameter OSCINDEX. As a result, the determination as to the catalyst deterioration can be free from the influence of the operating condition of the engine, which makes it possible to achieve accurate determination as to the catalyst deterioration over a wide range of the engine operating condition. That is, the determination time period TCHK is likely to be shortened as the exhaust gas flow rate becomes larger even when the oxygen storage capacity of the catalyst remains unchanged. In the conventional method, the determination as to the catalyst deterioration is carried out by comparing the determination time period TCHK with a predetermined reference value, which necessitates that the determination should be effected within a rather limited range of the engine operating condition. According to the present embodiment, however, the determination is carried out by taking into consideration a change in the exhaust gas flow rate, and therefore the above-mentioned excellent effect can be achieved.

The reason why the oxygen storage capacity of the catalyst, i.e. the maximum oxygen storage amount, can be accurately estimated by using the first determination parameter OSCINDEX will be described hereinbelow:

In FIG. 6B, a time period (TL) over which the sensor output SVO2 is higher than the reference voltage SVREF is a time period during which oxygen is stored in the catalyst. Over the time period TL, the correction coefficient KO2 is controlled so as to be linearly decreased with the lapse of time, so that the excess air ratio $\lambda$ of exhaust gases is linearly increased with the lapse of time. Therefore, the first determination parameter OSCINDEX is calculated by multiplying the determination time period TCHK by the flow rate integrated value GAIRSUM which corresponds to the integrated value of the exhaust gas flow rate, can function as a parameter proportional to the oxygen amount stored in the catalyst over the determination time period TCHK. Strictly speaking, almost half of the determination time period TCHK is a time period over which oxygen is stored in the catalyst and the remaining half of the time period is a period over which oxygen is emitted from the catalyst, which, however, does not deny the fact that the first determination parameter OSCINDEX is almost proportional to the oxygen storage capacity of the catalyst.

Referring again to FIG. 2, at a step S7, a counter NDETECT for counting the number of times of calculation ndetect of the first determination parameter OSCINDEX is incremented by "1". The count value ndetect is stored in a memory which is backed up by the battery, similarly to the first determination parameter OSCINDEX.

At the following step S9, it is determined whether or not the first determination parameter OSCINDEX calculated at the step S6 is equal to or larger than a first determination reference value LMTDC. If OSCINDEX 2 LMTDC holds, the program skips to a step S11. On the other hand, if OSCINDEX<LMTDC holds, it is determined at a step S10 that the catalyst in the exhaust gas-purifying device 13 is deteriorated, and then a first OK flag FOKDC is set to "0" to indicate that the catalyst is determined to be deteriorated by a first determination (step S9), and at the same time a first deterioration flag FNGDC is set to "1", followed by the program proceeding to the step S11.

At the step S11, it is determined whether or not the count value ndetect is equal to or larger than a predetermined value nDC (e.g. 6). If ndetect<nDC holds, the program skips to a step S13, whereas if ndetect≧nDC holds, the ndetect value is set to the predetermined value nDC at a step S12, followed by the program proceeding to the step S13.

At the step S13, a moving average value OSCMA of the first determination parameter OSCINDEX is calculated by the use of the following equation (5), and the calculated moving average value OSCMA is set as a second determination parameter:

$$OSCMA = \{OSCINDEX(n) + OSCINDEX(n-1) + \ldots + OSCINDEX(n-ndetect+1)\}/ndetect \quad (5)$$

where (n) represents that the parameter value is a present value, (n−1) an immediately preceding value, and (n−ndetect+1) a value obtained (ndetect-1) loops before the present loop. Values of the first determination parameter OSCINDEX have been sequentially stored in the ring buffer which is backed up by the battery. Further, the ring buffer for the OSCINDEX is initialized at the delivery, and once calculated values of the parameter OSCINDEX have been stored, the stored values are kept from being erased insofar as an accident such as removal of the battery does not happen.

Figure 8:
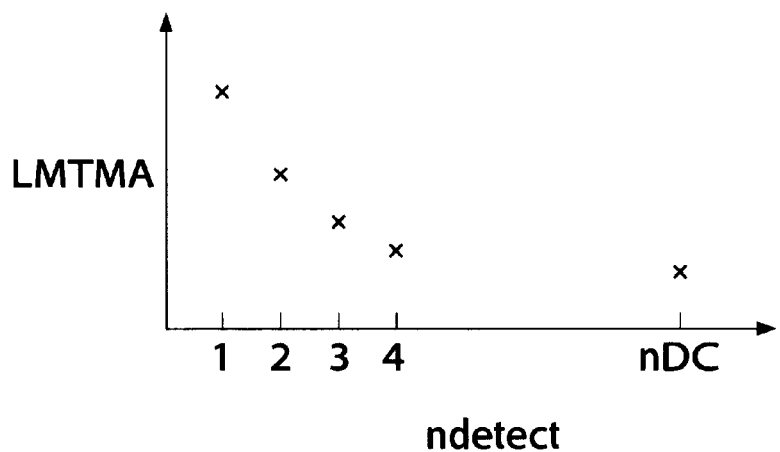
FIG. 8 shows a table which is used for obtaining a second determination reference value LMTMA.

At the following step S14, an LMTMA table, shown in FIG. 8, is retrieved according to the count value ndetect, to thereby obtain a second determination reference value LMTMA. The LMTMA table is set such that the LMTMA value is decreased (i.e. the determination that the catalyst is deteriorated is rendered more difficult) as the ndetect value increases. The first determination reference value LMTDC referred to above is set to a value smaller than a table value of the second determination reference value LMTMA assumed when ndetect=1 holds (i.e. a reference value which makes it easiest to determine that the catalyst is the deteriorated, among table values of the second determination reference value LMTMA), i.e. to a value making it less easy to determine the catalyst to be deteriorated.

Then, at a step S15, it is determined whether or not the second determination parameter OSCMA calculated at the step S13 is equal to or larger than the second determination reference value LMTMA, and if OSCMA≧LMTMA holds, it is determined at a step S16 that the catalyst is normal, and hence a second OK flag FOKMA is set to "1", followed by the program proceeding to a step S18. On the other hand, if OSCMA<LMTMA holds, it is determined at a step S17 that the catalyst in the exhaust gas-purifying device 13 is deteriorated, and hence the second OK flag FOKMA is set to "0" and at the same time a second deterioration flag FNGMA is set to "1", followed by the program proceeding to the step S18. At the step S18, the completion flag FDONE is set to "1" to indicate that the deterioration monitoring has been completed, followed by terminating the program.

Figure 9:
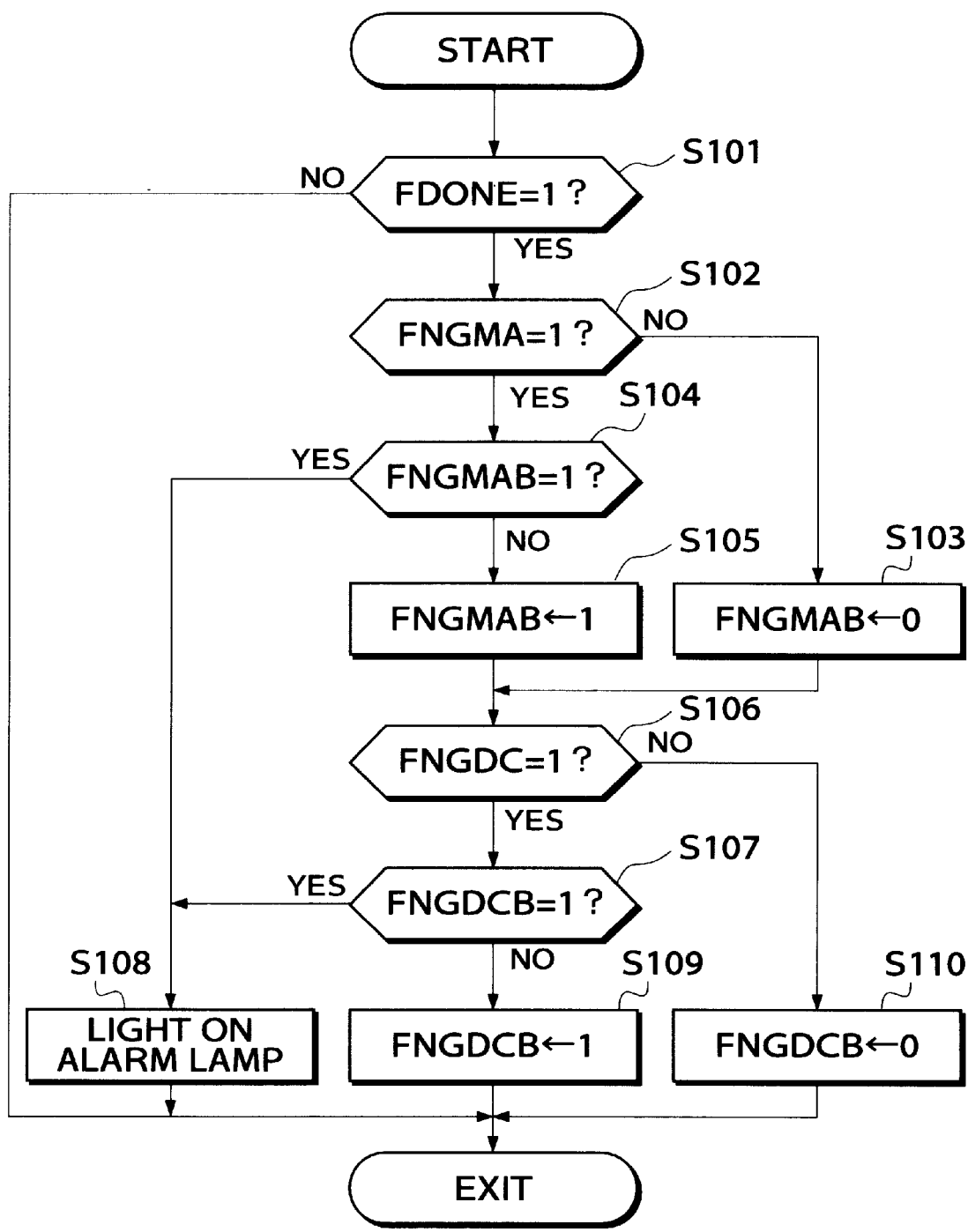
FIG. 9 is a flowchart showing a program for carrying out a deterioration-determining process.

The FIG. 2 program is executed at predetermined time intervals after the ignition switch is turned on. However, once the process from the step S5 to the step S18 is executed after the start of the engine, FDONE=1 holds at the step S2, and therefore the step S3 to S18 are no more executed during the operation of the engine. Thereafter, when the engine is stopped and then started again, the determination process from the step S5 to the step S18 is executed once. That is, the determination process is executed once over one operation period from the time the ignition switch is turned on to start the engine to the time the engine is stopped. In the present embodiment, a process shown in FIG. 9 is executed, wherein when the first deterioration flag FNGDC is consecutively set to "1" twice, or when the second deterioration flag FNGMA is consecutively set to "1" twice, it is finally determined that the catalyst is deteriorated. Then, an alarm lamp is lit to alert the driver to the catalyst being deteriorated. The alarm lamp is not lit unless the above condition is satisfied.

The FIG. 9 process is executed by the CPU 5b as a background process (i.e. when other processes with higher priority levels are not executed) whenever the ignition switch is turned on. The completion flag FDONE, and the first and second deterioration flags FNGDC and FNGMA are all initialized to "0" immediately after the ignition switch is turned on.

First, at a step S101, it is determined whether or not the completion flag FDONE is equal to "1". So long as FDONE=0 holds, the program is immediately terminated. On the other hand, if FDONE=1 holds, it is determined at a step S102 whether or not the second deterioration flag FNGMA is equal to "1". If FNGMA=0 holds, a second back-up flag FNGMAB is set to "0" at a step S103, followed by the program proceeding to a step S106. The value of the second back-up flag FNGMAB is stored in a memory which is backed-up by the battery.

If FNGMA=1 holds at the step S102, which means that the catalyst is deteriorated, it is determined at a step S104 whether or not the second back-up flag FNGMAB is equal to "1". When this question is first made, FNGMAB=0 holds, and then the second back-up flag FNGMAB is set to "1" at a step S105, followed by the program proceeding to the step S106.

At the step S106, it is determined whether or not the first deterioration flag FNGDC is equal to "1". If FNGDC=0 holds, a first back-up flag FNGDCB is set to "0" at a step S110, followed by terminating the program. The value of the first back-up flag FNGDCB is also stored in the memory backed-up by the battery.

If FNGDC=1 holds at the step S106, which means that the catalyst is deteriorated, it is determined at a step S107 whether or not the first back-up flag FNGDCB is equal to "1". When this question is first made, FNGDCB=0 holds, and then the first back-up flag FNGDCB is set to "1" at a step S109, followed by terminating the present routine.

If it is determined at the step S104 that the second back-up flag FNGMAB is equal to "1", which means that the flag FNGMA has been consecutively set to "1" twice, it is finally determined that the catalyst is deteriorated, and then the alarm lamp is lit at a step S108. Similarly, if it is determined at the step S107 that the first back-up flag FNGCB is equal to "1", which means that the flag FNGDC has been consecutively set to I"1" twice, it is finally determined that the catalyst is deteriorated, followed by lighting the alarm lamp at the step S108.

As described above, according to the present embodiment, the first determination parameter OSCINEX is calculated once over one operation period of the engine, and the moving average value OSCMA of the calculated value is set as the second determination parameter and compared with the second determination reference value LMTMA, to thereby carry out the catalyst deterioration determination, based on results of the comparison. As a result, the accuracy of the deterioration determination can be improved. It has been proved by a general statistical theory that the more samples used for calculating the moving average value, the higher the determination accuracy.

Further, if the number of times of calculation of the first determination parameter OSCINDEX (the number of times of measurement of the TCHK value) is small, the second determination reference value LMTMA is set depending on the number of times of calculation ndetect. As a result, the deterioration determination can be positively carried out even if the number of data to be averaged is small.

Further, since the deterioration determination is carried out based on a present value of the first determination parameter OSCINDEX at the step S9, it is possible to quickly detect a sudden deterioration of the catalyst (e.g. a deterioration due to abnormal combustion caused by a misfire, or a deterioration due to poisoning caused by deteriorated fuel), which cannot be readily detected by the determination based on the second determination parameter OSCMA. More specifically, since the second determination parameter OSCMA is a moving average value, if previous values of the first determination parameter OSCINDEX are normal and only a present value thereof decreases enough to show deterioration of the catalyst, the OSCMA value does not show a large decrease. Therefore, there is a possibility that such a sudden deterioration cannot be detected unless the number of samples is increased. However, by virtue of the determination at the step S9, such a sudden deterioration can be promptly detected.

Next, description will be made of a manner of setting a capacity ratio between the upstream storage section 13a and the downstream storage section 13b of the exhaust gas-purifying device 13 with reference to FIGS. 10 to 14. The ratio of a capacity RCATVOL of the downstream storage section 13b to a total capacity CATVOLT of the upstream storage section 13a and the downstream storage section 13b is defined as a capacity ratio RVR (=RCATVOL/CATVOLT). Characteristics shown in FIGS. 10 to 13 have been all empirically obtained.

Figure 10A:
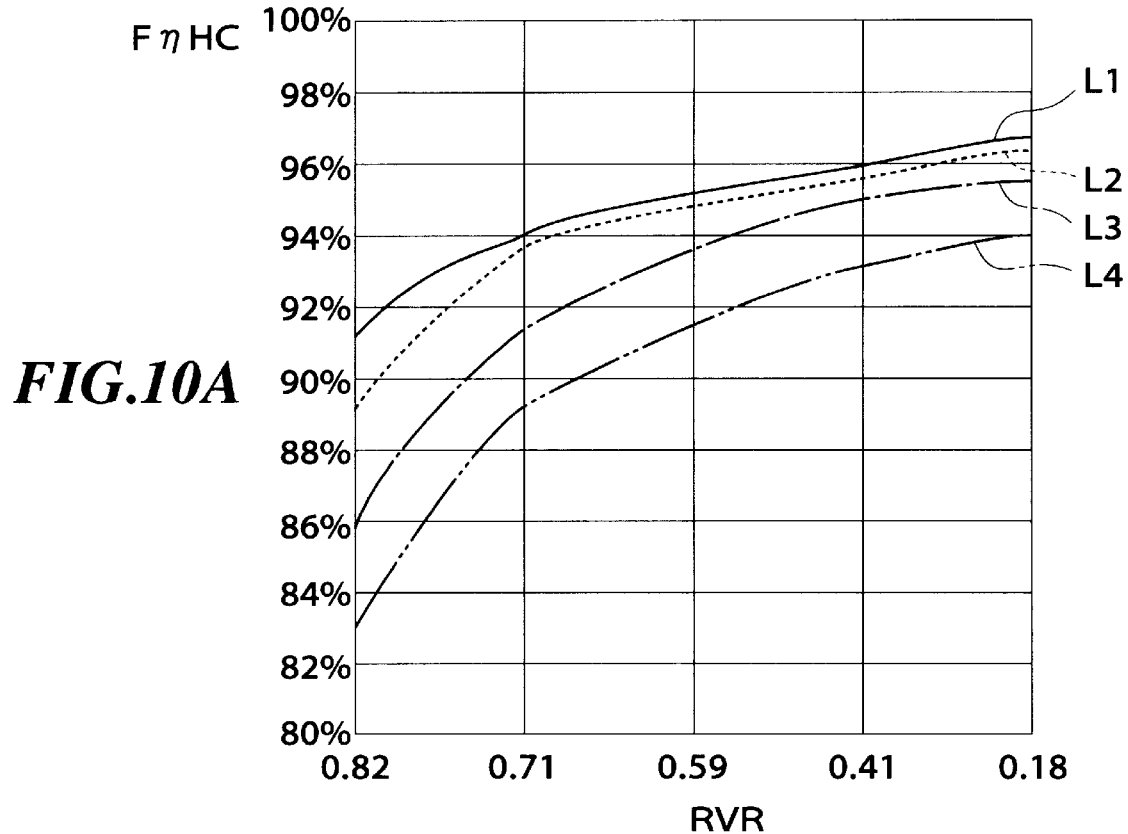
FIG. 10A is a graph showing changes in a purification rate FηHC of an exhaust gas-purifying device with respect to a use time period TAGE over which the exhaust gas-purifying device has been operated and a capacity ratio RVR.
Figure 10B:
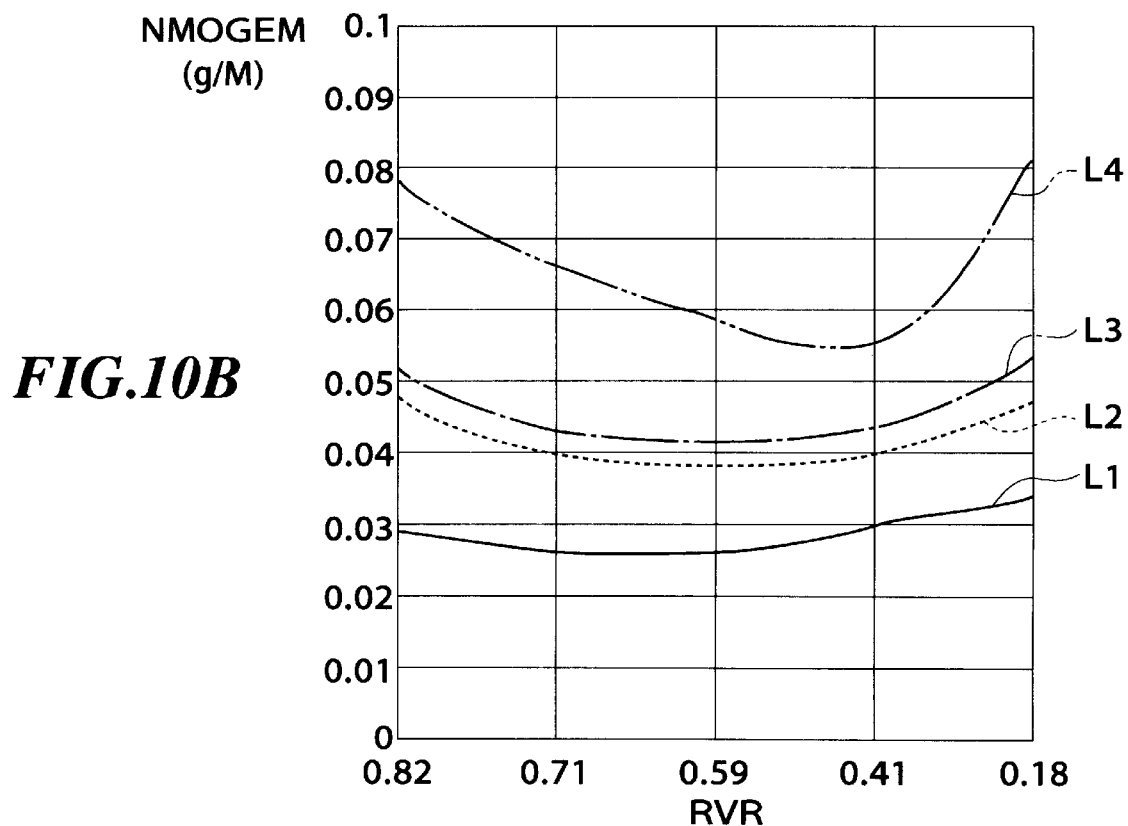
FIG. 10B is a graph showing changes in an amount NMOGEM of NMOG contained in exhaust gases having passed through the exhaust gas-purifying device with respect to the use time period TAGE of the exhaust gas-purifying device and the capacity ratio RVR.

FIG. 10A shows changes in a purification rate F-QHC of the upstream storage section 13a with respect to a use time period TAGE over which the exhaust gas-purifying device 13 have been operated and the capacity ratio RVR, and FIG. 10B shows changes in an amount NMOGEM of NMOG (Non-Methane Organic Gas: hydrocarbons excluding methane, which include aldehyde-ketones and alcohol-ethers) contained in exhaust gases having passed through the exhaust gas-purifying device 13 with respect to the use time period TAGE of the exhaust gas-purifying device 13 and the capacity ratio RVR. In the figures, the solid line L1, the broken line L2, the dot-dash line L3, and the two-dot-dash line L4 indicate characteristics assumed when TAGE=0, TAGE=1, TAGE=2, and TAGE=3 hold, respectively, wherein a relationship of 0<TAGEI<TAGE2<TAGE3 holds. The unit of the emission amount NMOGEM of NMOG is gram/mile.

As is clear from FIG. 10A, the longer the use time period TAGE, the lower the purification rate F$\eta$HC of the upstream storage section 13$a$, and the smaller the capacity ratio RVR, the higher the purification ratio F$_\eta$HC. Further, as is clear from FIG. 10B, the longer the use time period TAGE, the larger the emission amount NMOGEM of NMOG, and the optimum capacity ratio RVR (the ratio at which the NMOGEM value becomes minimum) varies depending on the use time period TAGE but falls within a range from 0.41 to 0.71.

FIG. 11 is a similar view to FIGS. 10A and 10B, but showing changes in the determination time period TCHK with respect to the use time period TAGE of the exhaust gas-purifying device 13 and the capacity ratio RVR. In the figure, the solid line L5 indicates a change in the time period TCHK assumed when the use time period TAGE is longer than the time period indicated by the two-dot-dash line L4, i.e. a change in the time period TCHK assumed when the deterioration has advanced, while the lines L2 to L4 correspond in use time TAGE to the lines L1 to L4 in FIGS. 10A and 10B, respectively.

As is clear from FIG. 11, the longer the use time period TAGE, the shorter the determination time period TCHK, and the smaller the RVR value, the larger the intervals between the lines L1 to L5, which correspond to respective different use time periods, i.e. respective different deterioration degrees of the catalyst. In other words, as the capacity ratio RVR is set to a smaller value, the deterioration determination value can be set to a more suitable value for accurate determination of the deterioration degree of the catalyst based on the determination time period TCHK, and hence an erroneous determination that the catalyst is abnormal though it functions normally can be avoided, leading to improved accuracy of the determination.

FIG. 12 shows changes in the purification rate F$\eta$HC of the upstream storage section 13$a$ with respect to the capacity ratio RVR and the determination time period TCHK. In the figure, the solid lines L11 to L15 indicate characteristics assumed when the RVR value assumes 0.18, 0.41, 0.59, 0.71 and 0.82, respectively.

As is clear from FIG. 12, a rate of change ($\Delta$F$\eta$HC/$\Delta$TCHK) in the purification rate F$\eta$HC in a region where the purification rate F$\eta$HC sharply decreases becomes smaller (i.e. the inclination becomes more moderate) as the capacity ratio RVR increases. Therefore, as the capacity ratio RVR is set to a larger value, the correlation between the determination time period TCHK and the purification rate F$\eta$HC is made clearer in determining the purification rate F$\eta$HC, based on the determination time period TCHK, and hence the accuracy of the determination can be improved.

By taking the above-mentioned two points into consideration, the capacity ratio RVR should not be set to a too large value or a too small value but to an intermediate value in order to accurately detect the deterioration of the catalyst.

FIG. 13 shows the relationship between a capacity CATVOL (L:liter) of the catalyst and the emission amount NMOGEM of NMOG. In the figure, the solid lines L21, L22, and L23 show characteristics obtained when a palladium-based catalyst, a platinum-palladium-based catalyst, and a platinum-palladium-rhodium-based catalyst are employed, respectively, after traveling of the vehicle over 100 miles. In the figure, the symbols TLEVSTD, LEVSTD, and ULEVSTD represent legally regulated values of the NMOG emission amount, and, for example, ULEVSTD×0.7 and ULEVSTD×1.5 indicate 0.7 times of the regulated value ULEVSTD and 1.5 times of the regulated value ULEVSTD, respectively.

Now, description will be made of how to determine the capacity CATVOLT of the whole catalyst in the exhaust gas-purifying device 13 and the capacity RCATVOL of the downstream storage section 13$b$ to satisfy the regulated value ULEVSTD when the palladium-based catalyst (solid line L21) is employed.

First, to design the device 13 so as to satisfy the regulated value ULEVSTD, the emission amount NMOGEM of NMOG should fall within a range from the value ULEVSTD×0.7 to a value ULEVSTD×0.75. Therefore, the Amaximum value CATVOLTMAX of the whole catalyst capacity CATVOLT of the exhaust gas-purifying device 13 should be set to a cross point A between the solid line L21 and the broken line indicative of the value ULEVSTD×0.7 in FIG. 12, i.e. CATVOLTMAX=1.85 (L). The minimum value CATVOLTMIN of the capacity CATVOLT should be set to a cross point B between the solid line L21 and the broken line indicative of the value ULEVSTD=0.75, i.e. CATVOLTMIN=1.69 (L).

On the other hand, the capacity RCATVOL of the downstream storage section 13$b$ should be determined as follows: That is, when the actual NMOG emission amount NMOGEM falls within a range from 1.0 to 1.5 times of the regulated value ULEVSTD, it is necessary that the alarm lamp is lit to alert the driver to the deterioration of the catalyst. Further, in the present embodiment, the deterioration degree of the whole catalyst including the catalyst in the downstream storage section 13$b$ is determined based on the deterioration degree of the catalyst in the upstream storage section 13$a$. Therefore, it is desirable that the catalyst in the downstream storage section 13$b$ alone should act to set the NMOG emission amount NMOGEM to the range from 1.0 to 1.5 times of the regulated value ULEVSTD. Therefore, the maximum value RCATVOLMAX of the capacity RCATVOL of the downstream storage section 13$b$ should be set to a cross point C between the solid line L21 and the broken line indicative of the value ULEVSTD, i.e. RCATVOLMAX=1.17 (L). The minimum value RCATVOLMIN of the capacity A 15 RCATVOL should be set to a cross point D between the solid line L21 and the solid line indicative of the value ULEVSTD×1.5, i.e. RCATVOLMIN=1.70 (L).

Since the whole capacity CATVOLT and the downstream storage section capacity RCATVOL should be determined as above, the maximum value RVRMAX of the capacity ratio RVR should be set to a value RCATVOLMAX/CATVOLTMIN=0.69, and the minimum value RVRMIN to a value RCATVOLMIN/CATVOLTMAX=0.38.

Row 1 in FIG. 14 shows results of the above calculations. Further, rows 2 to 5 show results of similar calculations of the maximum values RVRMAX and the minimum values RVRMIN of the capacity ratio RVR, obtained when the platinum-palladium-rhodium-based catalyst is employed to satisfy the regulated value TLEVSTD, when the platinum-palladium-rhodium-based catalyst is employed to satisfy the regulated value LEVSTD, when the platinum-palladium-based catalyst is employed to satisfy the regulated value LEVSTD, and when the palladium-based catalyst is employed to satisfy the regulated value LEVSTD, respectively.

As is understood from FIG. 14, irrespective of the type of the catalyst and the regulated value employed, the capacity ratio RVR should be set within a range from 0.4 to 0.7.

Thus, by synthetically considering the data shown in FIGS. 10 to 14, a conclusion can be reached that the capacity ratio RVR should be set within the range from 0.4 to 0.7. More specifically, if the capacity ratio RVR is set to a value smaller than 0.4, the NMOG emission amount NMOGEM sharply increases, e.g. the NMOG emission amount NMOGEM can exceed the value 1.5 times of the regulated value, as is apparent especially from the a two-dot-dash line L4 (characteristic obtained after using the catalyst for a long time period) in FIG. 10B. On the other hand, if the capacity ratio RVR is set to a value larger than 0.7, the NMOG emission amount NMOGEM after using the catalyst for a long time period increases (see FIG. 10B), and also the determination accuracy of the deterioration degree based on the determination time period TCHK is degraded to an unnegligible degree (see FIG. 11).

Therefore, by setting the capacity ratio RVR to a value within the range from 0.4 to 0.7, well-balanced exhaust gas-purifying performance can be achieved over a long term, which can satisfy all requirements in respect of the MNOG emission amount after using the catalyst for a long time period, the determination accuracy of the deterioration degree, and satisfaction of the regulated values.

The capacity ratio RVR can be converted into a ratio FVR of the capacity of the upstream storage section 13a to the whole capacity of the device 13, i.e. the capacity ratio RVR of 0.4 to 0.7 is equal to the capacity ratio FVR of 0.3 to 0.6.

Next, description will be made of a second embodiment of the invention.

In the first embodiment described above, the correction coefficient KO2 is calculated based on the output SVO2 from the downstream O2 sensor 15 by the FIG. 4 program. Further, to calculate the determination time period TCHK as the inversion period parameter representative of the period of inversion of the output from the oxygen concentration-detecting means, the inversion period of the SVO2 value is measured, i.e. the integrated values TRSUM and TLSUM are calculated, by the FIG. 5 program. According to the second embodiment, however, the correction coefficient KO2 is calculated by a program of FIG. 15 in place of the FIG. 4 program, and the integrated values TRSUM and TLSUM are calculated by a program of FIG. 16 in place of the FIG. 5 program. Except for the above programs, the second embodiment is identical with the first embodiment. In the present embodiment, a value CATKO2 is calculated by the FIG. 15 program and used as the KO2 value of the equation (1), during monitoring of the catalyst deterioration.

Figure 15:
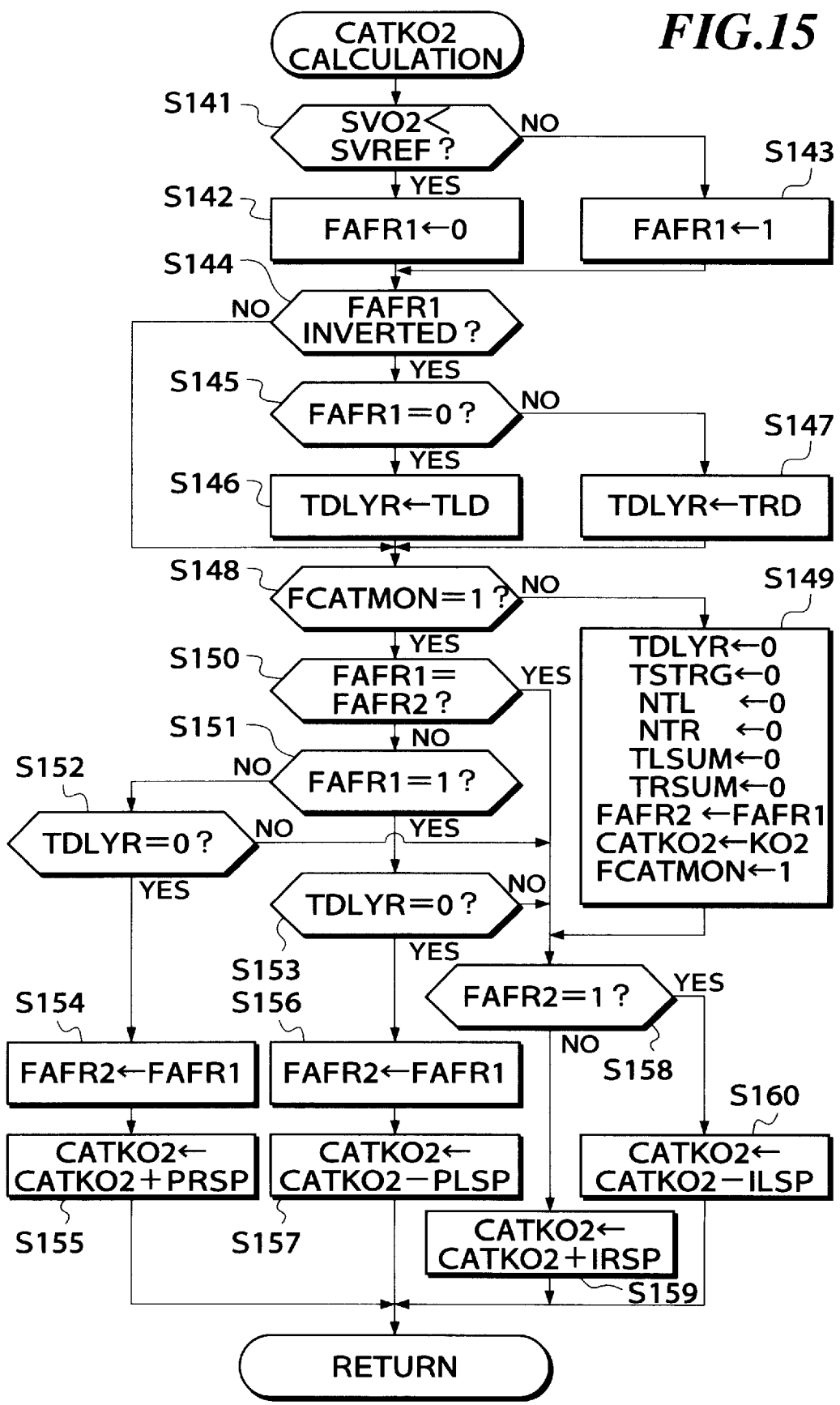
FIG. 15 is a flowchart showing a subroutine for calculating an air-fuel ratio correction coefficient CATKO2 during execution of the deterioration determination of the catalyst, according to a second embodiment of the invention.
Figure 17:
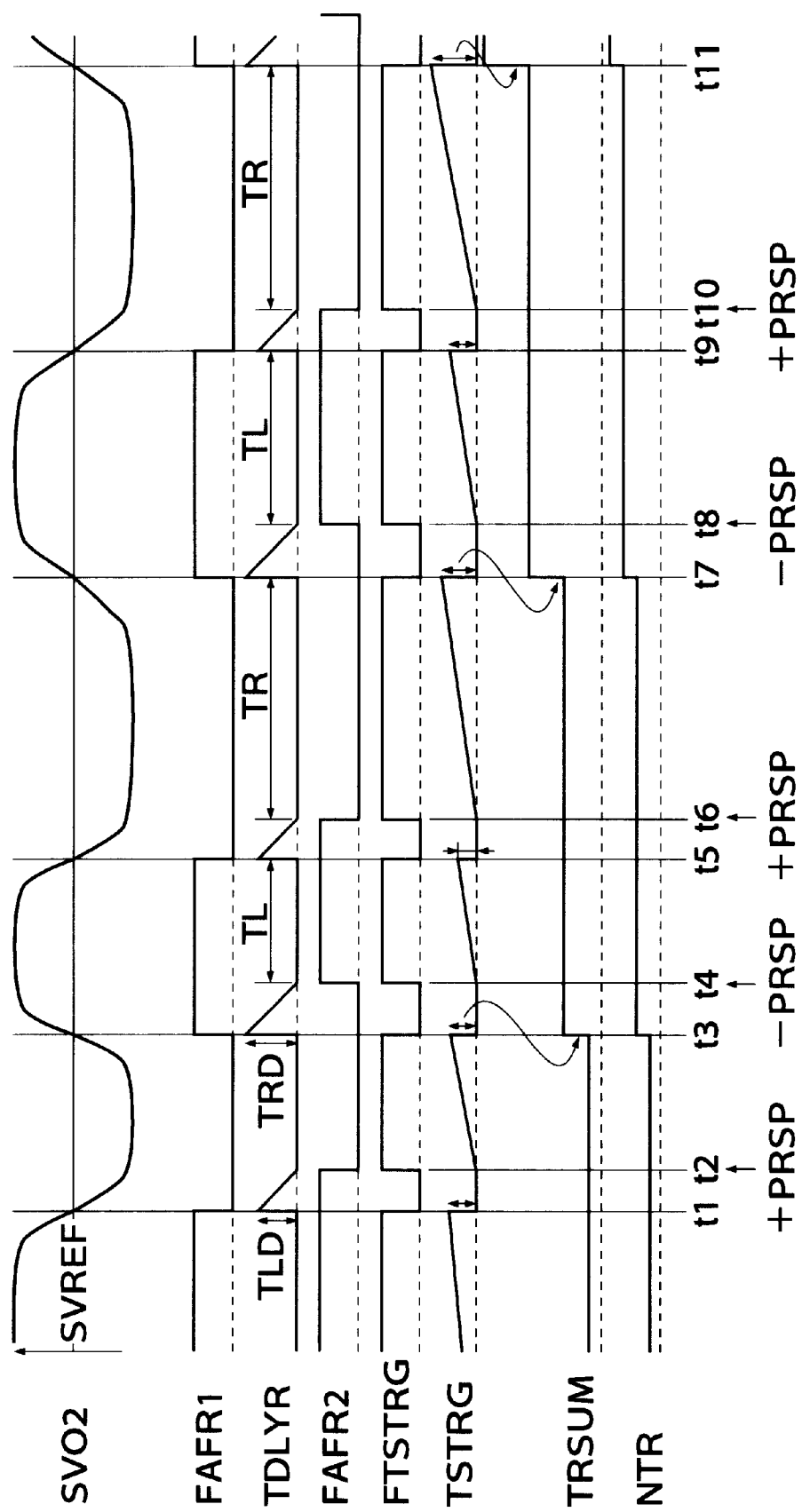
FIG. 17 is a timing chart useful in explaining the subroutines of FIGS. 15 and 16.

FIG. 15 shows a subroutine for calculating the CATKO2 value. Further, FIG. 17 shows the relationship between the downstream O2 sensor output SVO2, the values of various flags, and changes in parameters with the lapse of time.

First, at a step S141 in FIG. 15, it is determined whether or not the downstream O2 sensor output SVO2 is lower than the reference voltage SVREF, and if SVO2<SVREF holds, a first rich flag FAFRL is set to "0" at a step S142. On the other hand, if SVO2≧SVREF holds, the flag FAFR1 is set to "1" at a step S143. Thus, the first rich flag FAFR1, when set to "1", indicates that the SVO2 value is equal to or larger than the reference voltage SVREF. At the following step S144, it is determined whether or not the first rich flag FAFR1 has been inverted in value, and if the flag FAFR1 has not been inverted in value, the program jumps to a step S148. On the other hand, if the flag FAFR1 has been inverted in value, it is determined at a step S145 whether or not the first rich flag FAFR1 is equal to "0". If FAFRL=0 holds, which means that the downstream O2 sensor output SVO2 has been inverted from a rich side to a lean side (time points t1, t5, and t9 in FIG. 17), a down-counting delay timer TDLYR is set to to a lean-side predetermined time period TLD and started at a step S146, followed by the program proceeding to a step S148. On the other hand, if FAFRl=1 holds, which means that the SVO2 value has been inverted from the lean side to the rich side (time points t3, t7, t11 in FIG. 17), the timer TDLYR is set to a rich-side predetermined time period TRD and started at a step S147, followed by the program proceeding to the step S148.

At the step S148 it is determined whether or not the measurement-starting flag FCATMON is equal to "1". Immediately after the start of the monitoring, FCATMON=0 holds, and then the program proceeds to a step S149, wherein various timers, counters, flags, etc. are initialized. More specifically, the delay timer TDLYR, an up-counting timer TSTRG for measuring delay times TL' and TR', counters NTL and NTR for counting the number of times of measurement of the respective delay times TL' and TR', and the integrated values TLSUM and TRSUM of the delay times TL' and TR' are all set to "0", a second rich flag FAFR2 is set to the same value as the first rich flag FAFR1, the air-fuel ratio correction coefficient CATKO2 applied during the deterioration monitoring is set to the air-fuel ratio correction coefficient KO2 (a KO2 value assumed immediately before the deterioration monitoring), and the measurement-starting starting flag FCATMON is set to "1".

At the following step S158, it is determined whether or not the second rich flag FAFR2 is equal to "1". The second rich flag FAFR2, when set to "1", indicates that the rich-side predetermined time period TRD has elapsed after FAFR=1 has held, while, when set to "0", indicates that the lean-side predetermined time period TLD has elapsed after FAFR=0 has held. If FAFR2=0 holds (time periods t2 to t4, and t6 to t8 in FIG. 17), integral control is executed by adding the special I term ILSP to an immediately preceding value of the correction coefficient CATKO2 at a step S159, followed by terminating the present routine. If FAFR2=1 holds (time periods t4 to t6, and t8 to t10 in FIG. 17), integral control is executed by subtracting the special I term ILSP from an immediately preceding value of the correction coefficient CATKO2 at a step S160, followed by terminating the present routine.

In the next loop of execution of the present routine, the program proceeds from the step S148 to a step S150 since FCATMON=1 holds by the execution of the step S149 in the last loop. At the step S150, it is determined whether or not the first rich flag FAFR1 is equal to the second rich flag FAFR2. If FAFR1=FAFR2 holds (time periods t2 to t3, t4 to t5, t6 to t7, t8 to t9, and t10 to t11 in FIG. 17), the program proceeds to the step S158. On the other hand, if FAFR1≠FAFR2 holds (time periods t1 to t2, t3 to t4, t5 to t6, t7 to t8, and t9 to t10 in FIG. 17), it is determined at a step S151 whether or not the first rich flag FAFR1 is equal to "1".

If FAFR1=0 holds at the step S151 (time periods t1 to t2, t5 to t6, and t9 to t10 in FIG. 17), it is determined at a step S152 whether or not the delay timer TDLYR is equal to "0". If TDLYR>0 holds, the program proceeds to the step S158. If TDLYR=0 holds (time points t2, t6, and t10 in FIG. 17), the second rich flag FAFR2 is set to the same value as the first rich flag FAFR1 at a step S154, and the special P term PRSP is added to an immediately preceding value of the correction coefficient CATKO2 at a step S155, followed by terminating the present routine.

On the other hand, if FAFRL=1 holds at the step S151 (time periods t3 to t4, and t7 to t8 in FIG. 17), it is determined at a step S153 whether or not the delay timer TDLYR is equal to "0". If TDLYR>0 holds, the program proceeds to the step S158. If TDLYR=0 holds (time points t4 and t8 in FIG. 17), the second rich flag FAFR2 is set to the same value as the first rich flag FAFR1 at a step S156, and the special P term PRSP is subtracted from an immediately preceding value of the correction coefficient CATKO2 at a step S157, followed by terminating the present routine.

As described above, according to the FIG. 15 program, proportional control is executed (time points t2, t4, t6, t8, and t10 in FIG. 17) upon the lapse of the predetermine time period (TRD or TLD) after a time point of inversion of the downstream O2 sensor output SVO2 (time points t1, t3, t5, t7, and t9 in FIG. 17). Further, so long as FAFR2=0 holds, the integral control of the control correction coefficient CATKO2 in the direction of increasing the CATKO2 value is executed, while so long as FAFR2=1 holds, the integral control of the correction coefficient CATKO2 in the direction of decreasing the CATKO2 value is executed.

Figure 16:
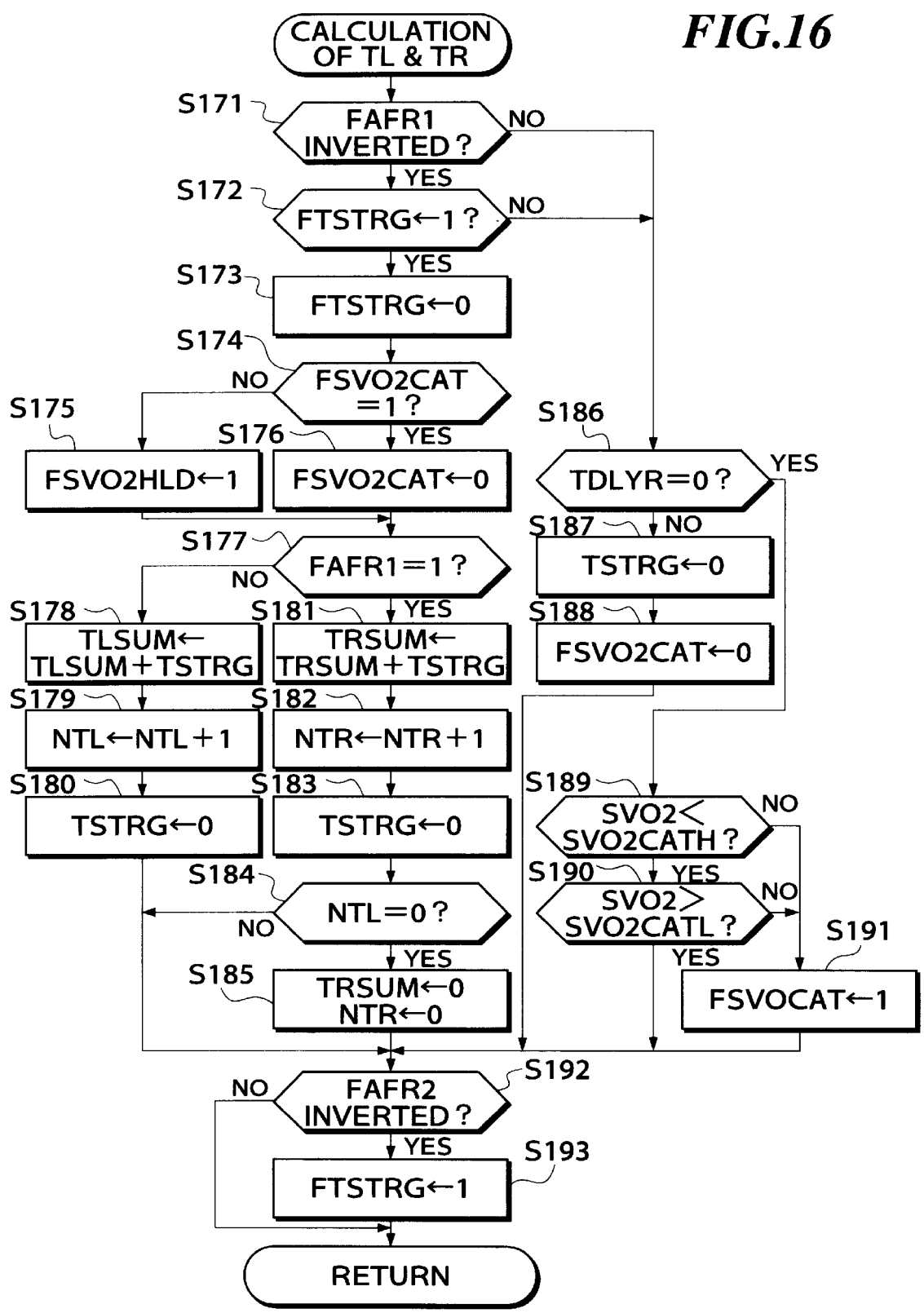
FIG. 16 is a flowchart showing a subroutine for calculating parameters TL and TR representative of the inversion period of the output SVO2 from the downstream O2 sensor, which is executed at the step S3 in FIG. 2.

FIG. 16 shows a program for calculating the TL' and TR' values. This program will now be described with reference to the timing chart of FIG. 17 as well.

First, at a step S171, it is determined whether or not the first rich flag FAFR1 shown in FIG. 17 has been inverted, and if the flag FAFR1 has been inverted, it is determined at a step S172 whether or not an inversion timer flag FTSTRG shown in FIG. 17 which, when set to "1", indicates that the present loop is within a delay time-measuring time period, is equal to "1". If the answer to the question of either of the steps S171 and S172 is negative (NO), i.e. if the first rich flag FAFR1 has not been inverted or the inversion timer flag FTSTRG is equal to "0", the program proceeds to a step S186, wherein it is determined whether or not the count value of the delay timer TDLYR shown in FIG. 17 is equal to 0. If TDLYR>0 holds, the delay time-measuring up-counting timer TSTRG shown in FIG. 17 is set to 0 at a step S187, and an output range flag FSVO2CAT which, when set to "1", indicates that the change in the downstream O2 sensor output SVO2 is larger than a predetermined value, is set to "0" at a step S188, followed by the program proceeding to a step S192.

On the other hand, if TDLYR=0 holds at the step S186, the program proceeds to a step S189, wherein it is determined whether or not the downstream O2 sensor output SVO2 is lower than a predetermined upper level SVO2CATH (e.g. 0.586 V). If SVO2<SVO2CATH holds, it is determined at a step S190 whether or not the SVO2 value is higher than a predetermined lower level SVO2CATL (e.g. 0.430 V). If SVO2CATL<SVO2<SVO2CATH holds, the program immediately proceeds to a step S192. On the other hand, if SVO2≧SVO2CATH or SVO2≦SVO2CATL holds, the output range flag FSVO2CAT is set to "1" at a step S191, followed by the program proceeding to the step S192. In other words, the output range flag FSVO2CAT is set to "0" if the SVO2 value is in the vicinity of the reference value SVREF after the lapse of the predetermined time period (TLD or TRD) from the inversion of the first rich flag FAFR1 (SVO2)(downstream O2 sensor output SVO2), to thereby indicate that the change in the downstream O2 sensor output SVO2 is small.

Then, it is determined at the step S192 whether or not the second rich flag FAFR2 shown in FIG. 17 has been inverted, and if the flag FAFR2 has not been inverted, the program is immediately terminated. On the other hand, if the flag FAFR2 has been inverted, the inversion timer flag FTSTRG is set to "1" at a step S193, followed by terminating the program.

On the other hand, if the answers to the questions of the steps S171 and S172 are both affirmative (YES), i.e. if the first rich flag FAFR1 has been inverted and the inversion timer flag FTSTRG is equal to "1", the program proceeds to a step S173, wherein the inversion timer flag FTSTRG is reset to "0", and then it is determined at a step S174 whether or not the output range flag FSVO2CAT is equal to "1". If FSVO2CAT=0 holds, which means that the change in the downstream O2 sensor output SVO2 is small, a hold flag FSVO2HLD is set to "1"at a step S175, followed by the program proceeding to a step S177. On the other hand, if FSVO2CAT=1 holds, the flag FSVO2CAT is reset to "0", followed by the program proceeding to the step S177.

At the step S177, it is determined whether or not the first rich flag FAFR1 is equal to "1". If FAFRL=0 holds, which means that the downstream O2 sensor output SVO2 is leaner than the reference value SVREF (time points t1, t5 and t9 in FIG. 17), the lean-side integrated value TLSUM is calculated by the use of the following equation (6). The count value of the timer TSTRG to be added corresponds to the delay time TL' in FIG. 17:

$$TLSUM = TLSUM + TSTRG \qquad (6)$$

Then, the lean-side counter NTL is incremented by "1" at a step S179, and the count value of the up-counting timer TSTRG is reset to "0" at a step S180, followed by the program proceeding to the step S192.

If FAFR1=1 holds at the step S177, i.e. if the downstream O2 sensor output SVO2 is richer than the reference value SVREF (time points t3, t7, and t11 in FIG. 17), the rich-side integrated value TRSUM (FIG. 17) is calculated at a step S181, by the use of the following equation (7). The count value of the timer TSTRG to be added corresponds to the delay time TR' in FIG. 17:

$$TRSUM = TRSUM + TSTRG \qquad (7)$$

Then, the rich-side counter NTR shown in FIG. 17 is incremented by "1" at a step S182, the up-counting timer TSTRG is reset to "0" at a step S183, and then it is determined at a step S184 whether or not the count value of the lean-side counter NTL is equal to "0". If NTL>0 holds, the program immediately proceeds to the step S192, whereas if NTL=0 holds, which means that this question is made immediately after the start of the deterioration monitoring, the rich-side integrated value TRSUM and the rich-side counter NTR are reset to "0" at a step S185, followed by the program proceeding to the step S192.

The steps S184 and S185 are provided for resetting the rich-side integrated value TRSUM and the counter NTR both to "0" when the TR' value is first measured, because the TLI value should be first measured in the delay time measurement.

As described above, according to the program of FIG. 16, the delay time TL' or TR' is integrated whenever the downstream O2 sensor output SVO2 is inverted, to thereby calculate the integrated value TLSUM or TRSUM. Although in the timing chart of FIG. 17, changes in the lean-side integrated value TLSUM and the count value of the lean-side counter NTL are not shown, the TLSUM value and the count value of the counter NTL are incremented at the time points t1, t5, and t9, similarly to the rich-side integrated value TRSUM and the count value of the rich-side counter NTR.

The thus calculated integrated values TRSUM and TLSUM are applied to the equation (2), and the count value of the rich-side counter NTR is applied as the nT value in the equation (2), to thereby calculate the determination time period TCHK.

Thus, the determination time period TCHK may be determined based on parameters related to the inversion period of the SVO2 value, in place of the inversion period per se.

This invention is not limited to the first and second embodiments described above, but various modifications or variations thereof are possible.

In the above described embodiments, the first determination parameter OSCINDEX is calculated by the use of the equation (3), and the moving average value thereof is set as the second determination parameter OSCMA to carry out the determination at the step S15 in FIG. 2. In a modification of these embodiments, however, the determination at the step S15 in FIG. 2 may be carried out in the following manner: That is, a moving average value TCHKAVE of the determination time period TCHK and a moving average value GAIRSUMAVE of the flow rate integrated value GAIRSUM are calculated by the use of the following equations (8) and (9), respectively:

$$TCHKAVE=\{TCHK(n)+TCHK(n-1)+\ldots +TCHK(n-ndetect+1)\}/ndetect \quad (8)$$

$$GAIRSUMAVE=\{GAIRSUM(n)+GAIRSUM(n-1)+\ldots +GAIRSUM(n-ndetect+1)\}/ndetect \quad (9)$$

Then, the OSCMA value is calculated by an equation OSCMA=TCHKAVE×GAIRSUSM, which is used for the determination at the step S15 in FIG. 2.

Figure 18:
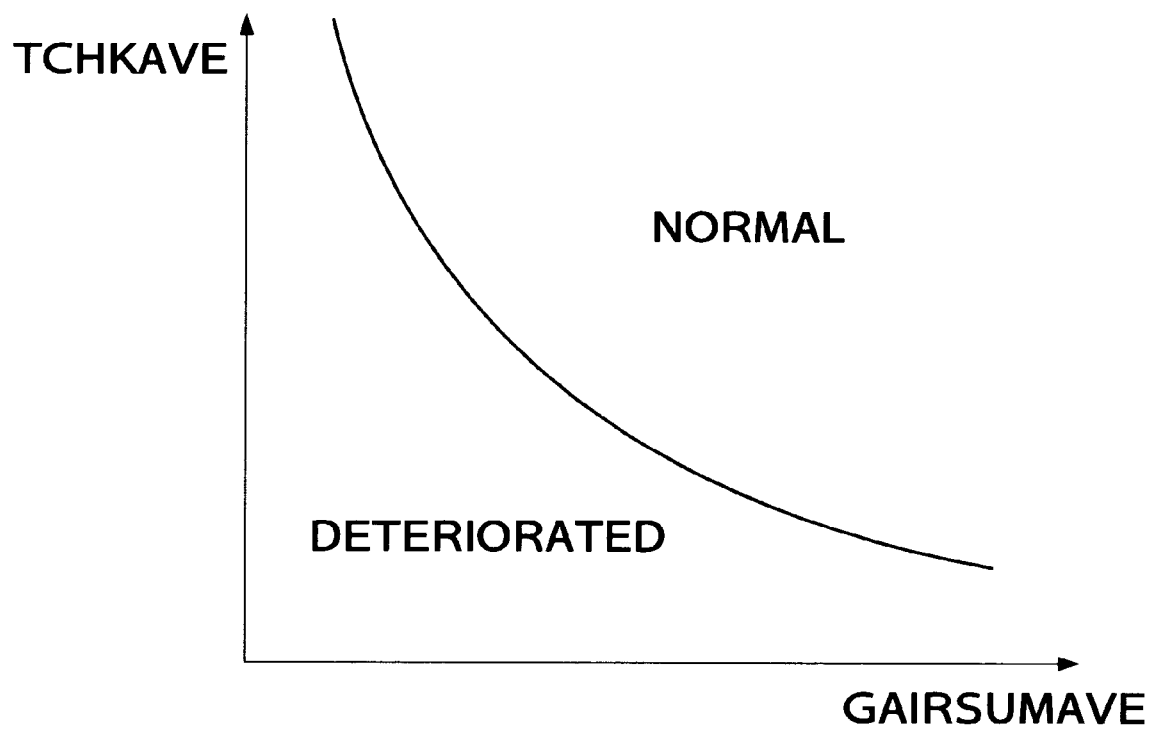
FIG. 18 shows a table for determining deterioration of the catalyst, based on moving average values TCHKAVE and GAIRSUMAVE.

In another modification, the determination at the step S15 in FIG. 2 may be replaced by the following determination: That is, a determination table, e.g. shown in FIG. 18, may be prepared beforehand, which is set according to the moving average values TCHKAVE and GAIRSUMAVE, and it is determined whether the calculated TCHKAVE and GAIRSUMAVE values correspond to a deteriorated region or a normal region in the table.

Further, although in the above described embodiments, the first determination parameter OSCINDEX is averaged to obtain the second determination parameter OSCMA, the second determination parameter OSCMA may be calculated by averaging the determination time period TCHK.

Further, although in the above described embodiments, the moving average value OSCMA of the first determination parameter OSCINDEX is calculated, it may be calculated by using the following averaging equation (10). The "averaging" in the present invention includes one carried out by the use of the equation (10):

$$OSCMA(n)=C\times OSCINDEX(n)+(1-C)\times OSCMA(n-1) \quad (10)$$

where C represents a positive constant smaller than 1.

Still further, in the above described embodiments, the integrated flow rate GAIRSUM is calculated by integrating the basic fuel injection amount TIM, however, the amount of intake air or the amount of exhaust gases may be detected by a sensor to calculate the GAIRSUM value. Alternatively, a map or a table may be provided for retrieving an amount of exhaust gases according to the engine rotational speed NE and the intake pipe absolute pressure PBA. The flow rate integrated value GAIRSUM may be calculated by integrating the determined exhaust gas amount.

Furthermore, although in the above described embodiments, the deterioration monitoring is carried out once over one operation period of the engine, the determination monitoring may be carried out twice or more over one operation period of the engine.

Moreover, in the above described embodiments, the alarm lamp is lit when the deterioration is consecutively determined twice. In a further modification, however, the deterioration monitoring may be carried out three times, for instance, and the alarm lamp may be lit if the deterioration determination is rendered twice out of the three times of deterioration monitoring. That is, when a frequency at which the catalyst is determined to be deteriorated is larger than a predetermined value, the deterioration determination may be finally rendered to lit the alarm lamp.

Figure 19:
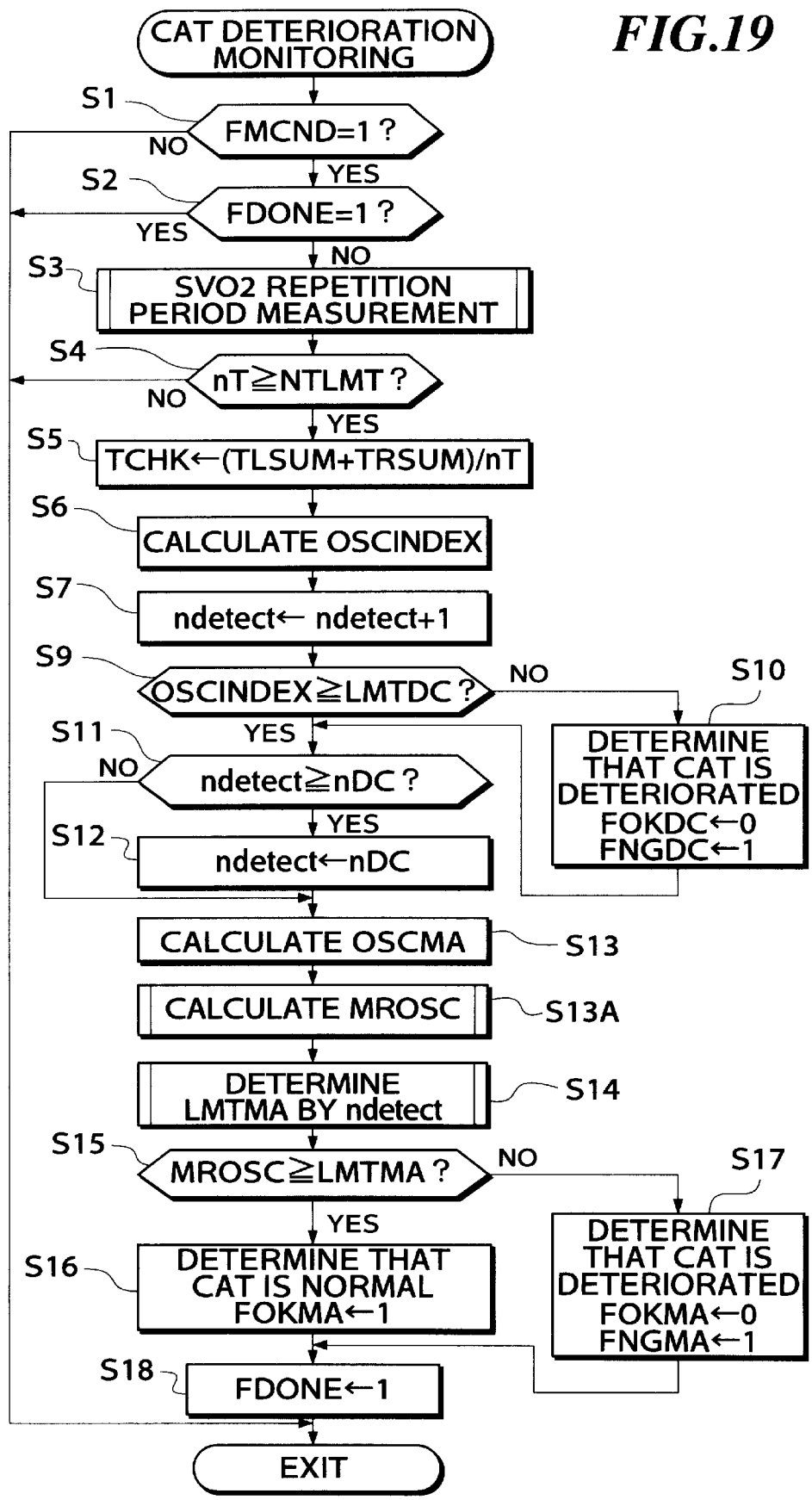
FIG. 19 is a flowchart showing a main routine for carrying out catalyst deterioration determination according to a third embodiment of the invention.

Next, description will be made of a third embodiment of the invention with reference to FIG. 19. In the present embodiment, only a catalyst deterioration-monitoring process of FIG. 19 is different from that of FIG. 2 in the first embodiment. Therefore, only this different process will be described.

FIG. 19 shows a program for executing the catalyst deterioration-monitoring according to the third embodiment. In the figure, the steps S1 to S13 are identical with those in FIG. 2, description thereof being omitted.

Figure 20:
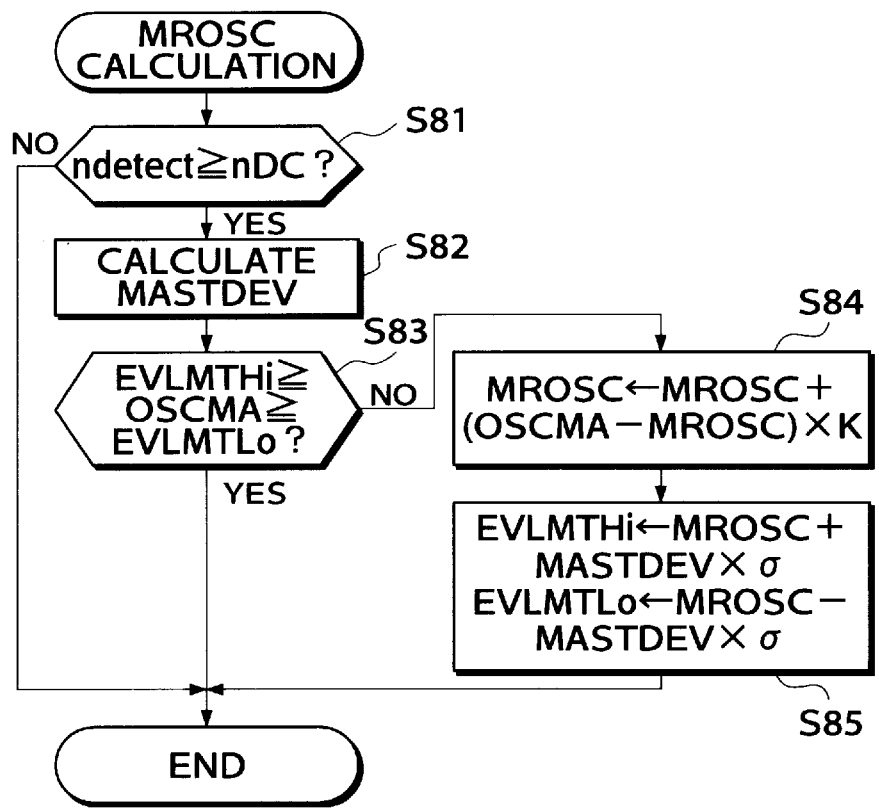
FIG. 20 is a flowchart showing a subroutine for calculating a third determination parameter MROSC representative of a central value of a moving average value OSCMA, which is executed at a step S13A in FIG. 19.

At a step S13A in FIG. 19, a calculation is made of a third determination parameter MROSC (deterioration index) indicative of a central value of the moving average value OSCMA. FIG. 20 shows a subroutine for calculating the third determination parameter MROSC, which is executed at the step S13A in FIG. 19. First, it is determined at a step S81 in FIG. 20 whether or not the count value ndetect of the counter NDETECT is larger than the predetermined value nDC (e.g. 6). If the count value ndetect of the counter NDETECT is smaller than the predetermined value nDC, the program is immediately terminated.

On the other hand, if the count value ndetect of the counter NDETECT is equal to or larger than the predetermined value nDC, a standard deviation MASTDEV of the first determination parameter OSCINDEX is calculated at a step S82, by the use of the following equation (11):

$$MASTDEV = \{|OSCMA - OSCINDEX(n)| + \\ |OSCMA - OSCINDEX(n-1)| + \ldots + \\ |OSCMA - OSCINDEX(n-ndetect+1)|\}/ \\ (ndetect-1) \quad (11)$$

In the first loop of execution of this subroutine, an upper limit value EVLMTHi of a monitoring region, hereinafter referred to, is set to an initial value obtained by adding the above obtained standard deviation MASTDEV to the moving average value OSCMA calculated at the step S13 in FIG. 19. Similarly, a lower limit value EVLMTLo of the monitoring region is set to an initial value obtained by subtracting the above standard deviation MASTDEV from the moving average value OSCMA.

Then, it is determined at a step S83 whether or not the moving average value OSCMA calculated at the step S13 falls within the monitoring region. If the moving average value OSCMA falls within the monitoring region, the program is immediately terminated. On the other hand, if the moving average value OSCMA does not fall within the monitoring region, the third determination parameter MROSC indicative of the central value of the moving average value OSCMA is updated at a step S84, by the use of the following equation (12):

$$MROSC=MROSC(-1)+(OSCMA-MROSC(-1))\times K \quad (12)$$

The third determination parameter MROSC is set to an initial value "0" at the delivery, and the initial value is updated by a value subsequently calculated and stored. The stored updated value is held unless the battery is removed. MROSC(-1) in the equation (12) represents the last value of the MROSC value. K represents a deviation weighting rate, which is desirably set to a value within a range of 0.6 to 0.8.

Then, at a step S85, the upper limit value EVLMTHi and lower limit value EVLMTLo of the monitoring region are updated by using the third determination parameter MROSC updated at the step S84 and the standard deviation MAST-DEV calculated at the step S82, by the use of the following equation (13):

$$EVLMTHi = MROSC + MASTDEV \times \sigma \quad EVLMTLo = MROSC - MASTDEV \times \sigma \quad (13)$$

where $\sigma$ represents a standard deviation weighting rate, which is desirably set to a value within a range of 1.0 to 2.0.

Figure 21:
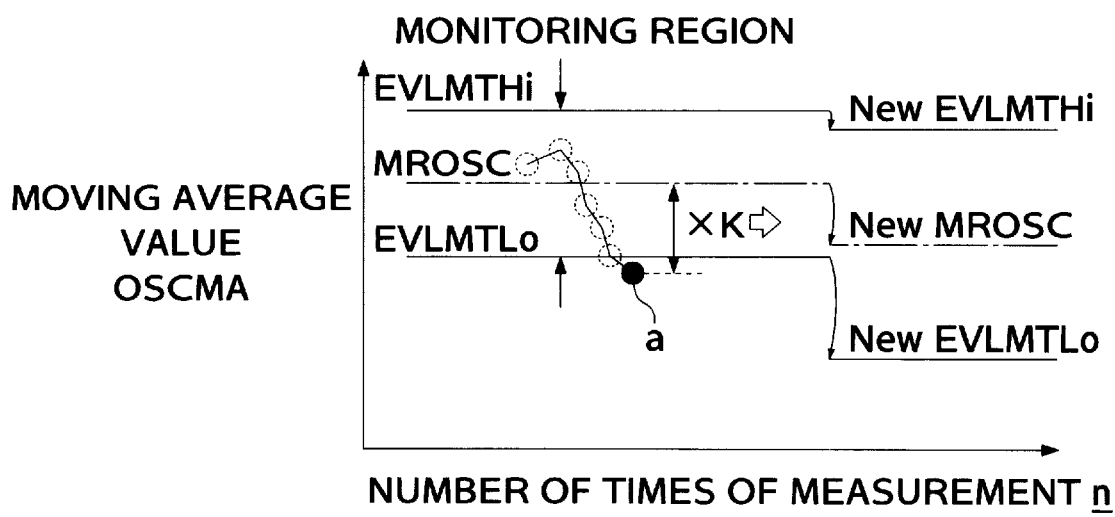
FIG. 21 is a graph useful in explaining updating of the third determination parameter MROSC and upper and lower limit values EVLMTHi and EVLMTLo of a monitoring region.

FIG. 21 shows the manner of updating the third determination parameter MROSC and the upper and lower limit values EVLMTHi and EVLMTLo of the monitoring region. If the moving average value OSCMA becomes smaller than the lower limit value EVLMTLo, as indicated by a point a in the figure, the third determination parameter MROSC and the upper and lower limit values EVLMTHi and EVLMTLo are updated to values New MROSC, New EVLMTHi, New EVLMTLo, respectively, which are smaller than the immediately preceding values.

Figure 22:
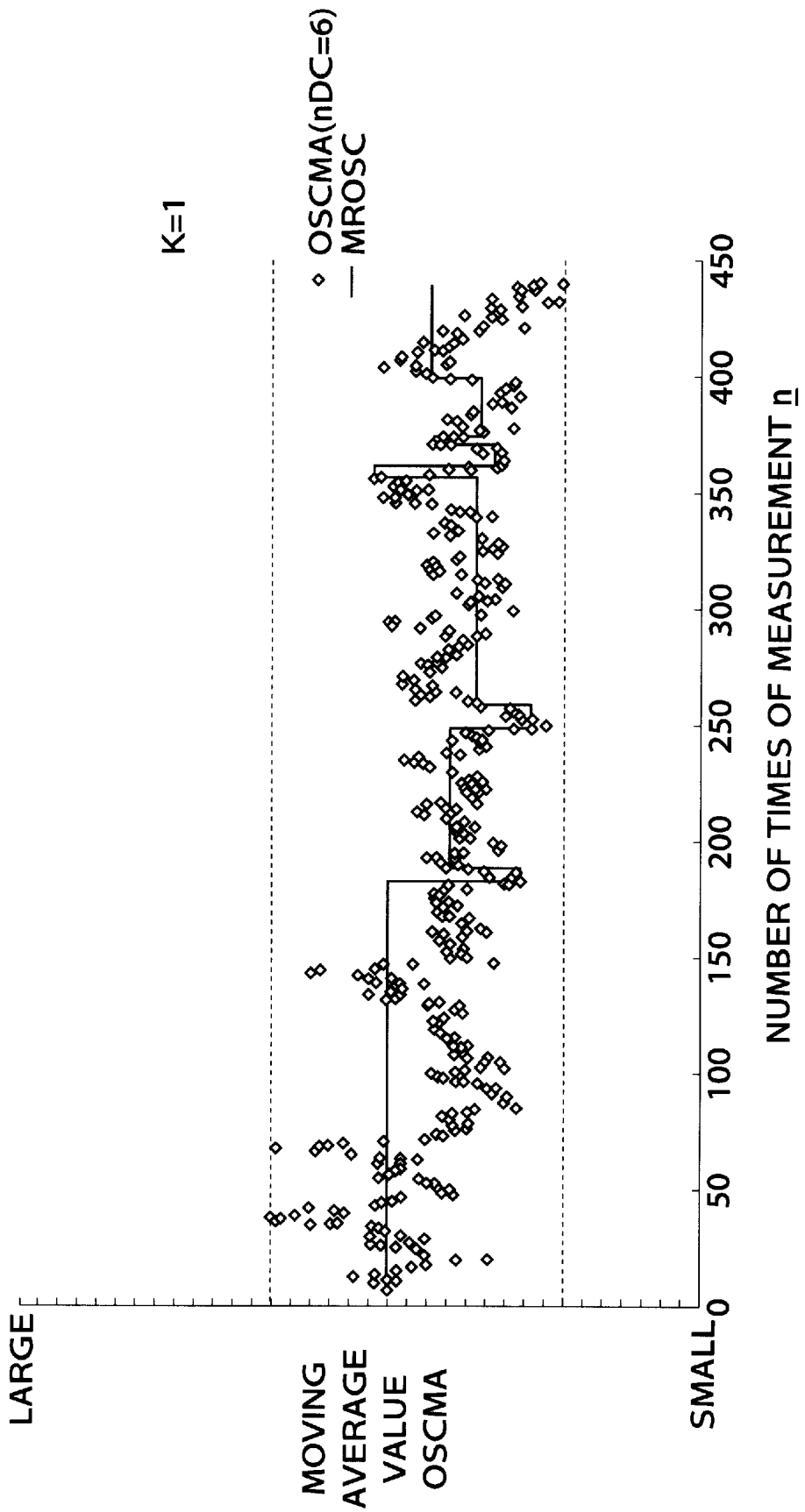
FIG. 22 is a graph showing changes in the moving average value OSCMA and the third determination parameter MROSC obtained when a deviation weighting rate K assumes 1.

FIG. 22 shows changes in the moving average value OSCMA and the third determination parameter MROSC provided that the deviation weighting rate K is set to 1. The figure shows a case where the moving-averaging is executed over a short time interval corresponding to nDC=6, i.e. over which the first determination parameter OSCINDEX is calculated 6 times (number of samples). The moving average value OSCMA calculated over the short time interval is larger in fluctuation than one calculated over a long time interval (corresponding, e.g. to nDC=20). The third determination parameter MROSC indicative of the central value of the OSCMA value calculated over the short time interval, however, changes similarly to the MROSC value calculated over the long time interval, that is, the manner of changes in the MROSC value does not depend upon the nDC value.

Figure 23:
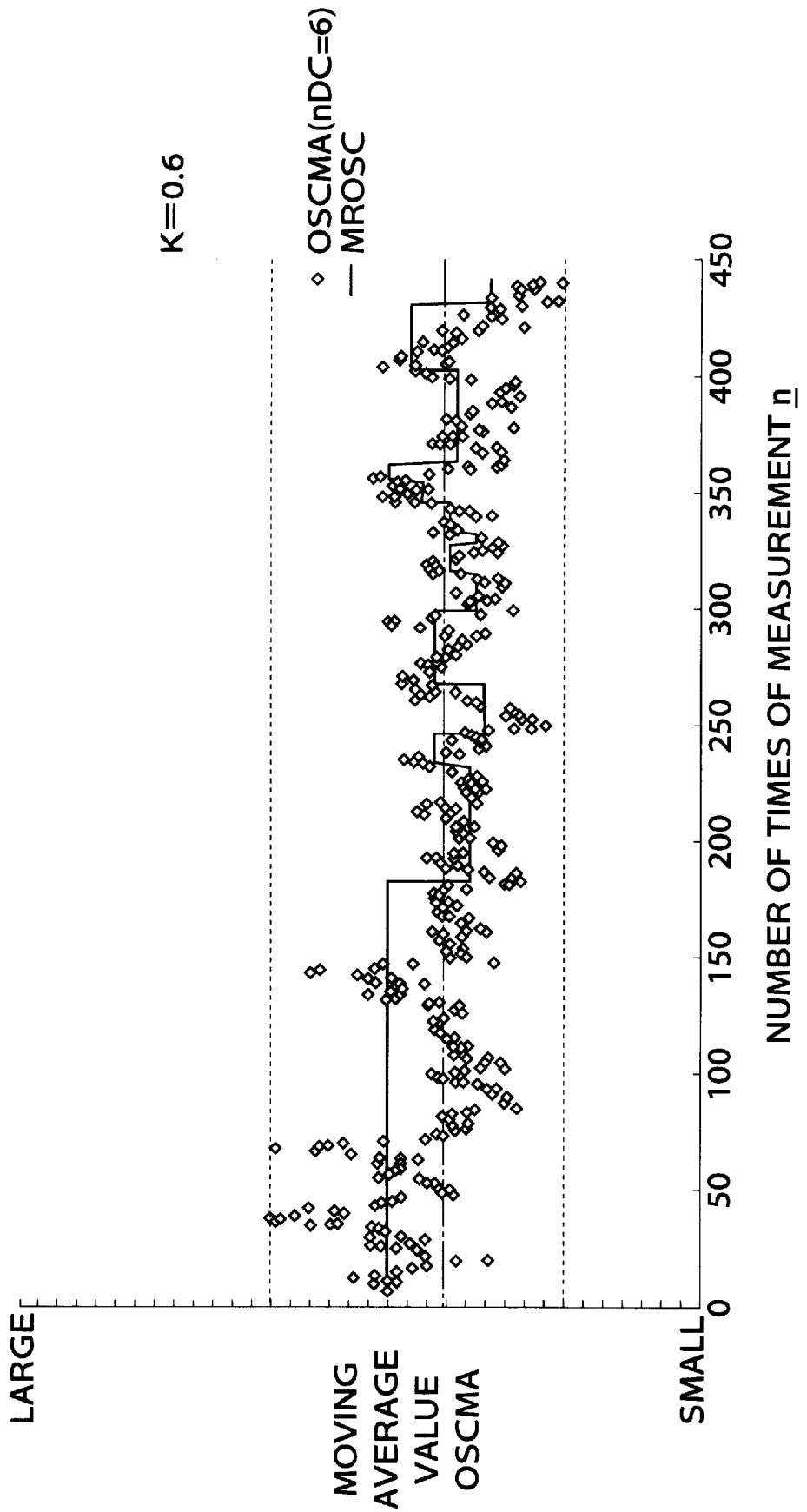
FIG. 23 is a graph showing changes in the moving average value OSCMA and the third determination parameter MROSC when the deviation weighting rate K assumes 0.6.

FIG. 23 shows changes in the moving average value OSCMA and the third determination parameter MROSC provided that the deviation weighting rate K is set to 0.6. The figure shows a case where the moving averaging is executed over the short time interval corresponding to nDC=6. It should be noted that when the the deviation weighting rate K is set to 0.6, the third determination parameter MROSC indicative of the central value of the moving average value OSCMA changes similarly to the MROSC value calculated over the long time interval, i.e. irrespective of the nDC value, and further the fluctuation amount is smaller than the case where K=1 holds.

Referring again to FIG. 19, at the step S14, the LMTMA table shown in FIG. 8 is retrieved according to the count value ndetect, to thereby determine the second determination reference value LMTMA.

Then, at a step S15A, it is determined whether or not the third determination parameter MROSC calculated at the step S13A is equal to or larger than the second determination reference value LMTMA. If MROSC>LMTMA holds, it is determined at the step S16 that the catalyst is normal, and hence the second OK flag FOKMA is set to "1", followed by the program proceeding to the step S18. On the other hand, if MROSC<LMTMA holds, it is determined at the step S17 that the catalyst in the exhaust gas-purifying device 13 is deteriorated, and hence the second OK flag FOKMA is set to "0" and at the same time the second deterioration flag FNGMA is set to "1", followed by the program proceeding to the step S18. At the step S18, the completion flag FDONE is set to "1" to indicate that the deterioration monitoring has been completed, followed by terminating the program.

As described above, according to the present embodiment, the first determination parameter OSCINDEX is calculated once over one operation period of the engine, and the moving average value OSCMA of the calculated OSCINDEX value is calculated, the third deterioration parameter MROSC indicative of the central value of the calculated moving average value OSCMA is calculated, followed by comparing the calculated parameter MROSC with the second determination reference LMTMA, to thereby carry out the deterioration determination, based on results of the comparison. As a result, the accuracy of the deterioration determination can be improved. It has been proved by a general statistical theory that the more samples used for calculating the moving average value, the higher the determination accuracy.

Further, since the deterioration determination is carried out based on a present value of the first determination parameter OSCINDEX at the step S9, similarly to the first embodiment, it is possible to quickly detect a sudden deterioration of the catalyst (e.g. a deterioration due to abnormal combustion caused by a misfire, or a deterioration due to poisoning caused by deteriorated fuel), which cannot be readily detected by the determination based on the second determination parameter OSCMA. More specifically, since the third determination parameter MROSC indicates the central value of the moving average value OSCMA, if previous values of the first determination parameter OSCINDEX are normal and only a present value thereof assumes a decreased value indicating a deterioration of the catalyst, the OSCMA value does not promptly decrease. Therefore, there is a possibility that such a sudden deterioration cannot be detected unless the number of samples is increased. However, by virtue of the determination at the step S9, such a sudden deterioration can be promptly detected.

Still further, the third determination parameter MROSC calculated over a short time interval changes similarly to one calculated over a long time interval, and therefore it can accurately indicate the central value of the moving average value OSCMA irrespective of the time interval over which the OSCMA value is calculated. As a result, the deterioration determination can be accurately carried out. Especially, when the deviation weighting rate K is set to a value smaller than 1, the fluctuation amount of the moving average value OSCMA can be suppressed, to obtain the central value of the OSCMA value in a more accurate manner.

In the third embodiment described above, the second determination reference value LMTMA is set so as to be decreased (i.e. in the direction of rendering more difficult the determination that the catalyst is deteriorated) as the ndetect value increases. Since the third determination parameter MROSC calculated over a short time interval changes similarly to one calculated over a long time interval, however, the second determination reference value may be set to a constant value irrespective of the ndetect value.

What is claimed is:

1. In a catalyst deterioration-determining system for an internal combustion engine having an exhaust system, catalyst means arranged in the exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said air-fuel ratio control means, the improvement, wherein:

said catalyst deterioration-determining means includes measuring means for measuring an inversion period parameter representative of a repetition period of change in said output from said oxygen concentration-detecting means over each period of a plurality of predetermined diagnosis periods, memory means for storing each value of said inversion period parameter measured by said measuring means, and determination parameter-calculating means for calculating a determination parameter by averaging a plurality of values of said inversion period parameter measured by said measuring means and stored by said memory means over said plurality of predetermined diagnosis periods, said catalyst deterioration-determining means carrying out said determination of deterioration of said catalyst means, based on said determination parameter.

2. A catalyst deterioration-determining system as claimed in claim 1, wherein said catalyst deterioration-determining means carries out said deterioration determination by comparing said determination parameter with a first determination reference value, and changes said first determination reference value according to a number of times of measurement of said inversion period parameter.

3. In a catalyst deterioration-determining system for an internal combustion engine having an exhaust system, catalyst means arranged in the exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said air-fuel ratio control means, the improvement, wherein:

said catalyst deterioration-determining means includes measuring means for measuring an inversion period parameter representative of a repetition period of change in said output from said oxygen concentration-detecting means over a predetermined diagnosis period, and determination parameter-calculating means for calculating a determination parameter by averaging values of said inversion period parameter measured over different diagnosis periods as said predetermined diagnosis period by said measuring means, said catalyst deterioration-determining means carrying out said determination of deterioration of said catalyst means, based on said determination parameter, wherein said catalyst deterioration-determining means carries out said deterioration determination by comparing said determination parameter with a first determination reference value, and changes said first determination reference value according to a number of times of measurement of said inversion period parameter, and wherein said catalyst deterioration-determining means changes said first determination reference value in a direction of making it more difficult to determine that said catalyst means is deteriorated, as said number of times of measurement of said inversion period parameter increases.

4. A catalyst deterioration-determining system as claimed in any of claims 1 to 3, further including direct determining means for carrying out determination of deterioration of said catalyst means, based on said inversion period parameter.

5. A catalyst deterioration-determining system as claimed in any of claims 1 to 3, wherein said determination parameter is a moving average value of said inversion period parameter.

6. A catalyst deterioration-determining system as claimed in any of claims 1 to 3, wherein said measuring means measures a first parameter representative of said repetition period of change in said output from said oxygen concentration-detecting means and a second parameter representative of a flow rate of exhaust gases emitted from said engine, and uses a combination of the measured first and second parameters as said inversion period parameter.

7. A catalyst deterioration-determining system as claimed in any of claims 1 to 3, wherein said predetermined diagnosis period is included in one operating period of said engine, said measuring means measuring said inversion period parameter once over said one operating period of said engine.

8. In a catalyst deterioration-determining system for an internal combustion engine having an exhaust system, catalyst means arranged in the exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said air-fuel ratio control means, the improvement, wherein:

said catalyst deterioration-determining means includes measuring means for measuring an inversion period parameter representative of a repetition period of change in said output from said oxygen concentration-detecting means over a predetermined diagnosis period, and determination parameter-calculating means for calculating a determination parameter by averaging values of said inversion period parameter measured over different diagnosis periods as said predetermined diagnosis period by said measuring means, said catalyst deterioration-determining means carrying out said determination of deterioration of said catalyst means, based on said determination parameter, said system further including direct determining means for carrying out determination of deterioration of said catalyst means based on said inversion period parameter.

wherein said direct determining means carries out said deterioration determination by comparing said inversion period parameter with a second determination reference value, and sets said second determination reference value to a value which makes it more difficult to determine that said catalyst means is deteriorated than said first determination reference value.

9. In a catalyst deterioration-determining system for an internal combustion engine having an exhaust system, catalyst means arranged in the exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said air-fuel ratio control means, the improvement, wherein:

said catalyst deterioration-determining means includes measuring means for measuring an inversion period parameter representative of a repetition period of change in said output from said oxygen concentration-detecting means over a predetermined diagnosis period, and determination parameter-calculating means for calculating a determination parameter by averaging values of said inversion period parameter measured over different diagnosis periods as said predetermined diagnosis period by said measuring means, said catalyst deterioration-determining means carrying out said determination of deterioration of said catalyst means, based on said determination parameter.

wherein said catalyst deterioration-determining means finally determines that said catalyst means is deteriorated when a frequency at which it is determined that said catalyst means is deteriorated exceeds a predetermined value.

10. In a catalyst deterioration-determining system for an internal combustion engine having an exhaust system, catalyst means arranged in said exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said air-fuel ratio control means, the improvement, wherein:

said catalyst deterioration-determining means includes first measuring means for measuring an inversion period parameter representative of a repetition period of change in said output from said oxygen concentration-detecting means over a predetermined diagnosis period, second measuring means for measuring an exhaust gas flow rate parameter representative of a flow rate of exhaust gases emitted from said engine, first determination parameter-calculating means for calculating a first determination parameter based on said inversion period parameter and said exhaust gas flow rate parameter measured by said first and second measuring means, and second determination parameter-calculating means for calculating a second determination parameter by averaging said first determination parameter calculated over different diagnosis periods as said predetermined diagnosis period by said first determination parameter-calculating means, said catalyst deterioration-determining means carrying out said determination of deterioration of said catalyst means, based on said first and second determination parameters.

11. In a catalyst deterioration-determining system for an internal combustion engine having an exhaust system, catalyst means arranged in the exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said air-fuel ratio control means, the improvement, wherein:

said catalyst deterioration-determining means includes measuring means for measuring an inversion period parameter representative of a repetition period of change in said output from said oxygen concentration-detecting means over a predetermined diagnosis period, and determination parameter-calculating means for calculating a determination parameter by averaging values of said inversion period parameter measured over different diagnosis periods as said predetermined diagnosis period by said measuring means, said catalyst deterioration-determining means carrying out said determination of deterioration of said catalyst means, based on said determination parameter, wherein said catalyst deterioration-determining means carries out said deterioration determination by comparing said determination parameter with a first determination reference value, and changes said first determination reference value according to a number of times of measurement of said inversion period parameter, said system further including direct determining means for carrying out determination of deterioration of said catalyst means, based on said inversion period parameter, and wherein said direct determining means carries out said deterioration determination by comparing said inversion period parameter with a second determination reference value, and sets said second determination reference value to a value which makes it more difficult to determine that said catalyst means is deteriorated than said first determination reference value.

12. In a catalyst deterioration-determining system for an internal combustion engine having an exhaust system, catalyst means arranged in the exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said air-fuel ratio control means, the improvement, wherein:

said catalyst deterioration-determining means includes measuring means for measuring an inversion period parameter representative of a repetition period of change in said output from said oxygen concentration-detecting means over a predetermined diagnosis period, and determination parameter-calculating means for calculating a determination parameter by averaging values of said inversion period parameter measured over different diagnosis periods as said predetermined diagnosis period by said measuring means, said catalyst deterioration-determining means carrying out said determination of deterioration of said catalyst means, based on said determination parameter, wherein said catalyst deterioration-determining means carries out said deterioration determination by comparing said determination parameter with a first determination reference value, and changes said first determination reference value according to a number of times of measurement of said inversion period parameter, and wherein said catalyst deterioration-determining means changes said first determination reference value in a direction of making it more difficult to determine that said catalyst means is deteriorated, as said number of times of measurement of said inversion period parameter increases, said system further including direct determining means for carrying out determination of deterioration of said catalyst means, based on said inversion period parameter, and wherein said direct determining means carries out said deterioration determination by comparing said inversion period parameter with a second determination reference value, and sets said second determination reference value to a value which makes it more difficult to determine that said catalyst means is deteriorated than said first determination reference value.

13. In a catalyst deterioration-determining system for an internal combustion engine having an exhaust system, catalyst means arranged in the exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said airduel ratio control means, the improvement, wherein:

said catalyst deterioration-determining means includes measuring means for measuring inversion period parameter representative of a repetition period of change in said output from said oxygen concentration-detecting means over a predetermined diagnosis period, and determination parameter-calculating means for calculating a determination parameter by averaging values of said inversion period parameter measured over different diagnosis periods as said predetermined diagnosis period by said measuring means, said catalyst deterioration-determining means carrying out said determination of deterioration of said catalyst means, based on said determination parameter, wherein said catalyst deterioration-determining means carries out said deterioration determination by comparing said determination parameter with a first determination reference value, and changes said first determination reference value according to a number of times of measurement of said inversion period parameter, and wherein said catalyst deterioration-determining means finally determines that said catalyst means is deteriorated when a frequency at which it is determined that said catalyst means is deteriorated exceeds a predetermined value.

14. In a catalyst deterioration-determining system for an internal combustion engine having an exhaust system, catalyst means arranged in the exhaust system, for purifying exhaust gases emitted from said engine, oxygen concentration-detecting means arranged in said exhaust system at a lo cation downstream of said catalyst means, for detecting concentration of oxygen present in said exhaust gases, and air fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said air-fuel ratio control means, the improvement, wherein:

said catalyst deterioration-determining means includes measuring means for measuring an inversion period parameter representative of a repetition period of change in said output from said oxygen concentration-detecting means over a predetermined diagnosis period, and determination parameter-calculating means for calculating a determination parameter by averaging values of said inversion period parameter measured over different diagnosis periods as said predetermined diagnosis period by said measuring means, said catalyst deterioration-determining means carrying out said determination of deterioration of said catalyst means, based on said determination parameter, wherein said catalyst deterioration-determining means carries out said deterioration determination by comparing said determination parameter with a first determination reference value, and changes said first determination reference value according to a number of times of measurement of said inversion period parameter, and wherein said catalyst deterioration-determining means changes said first determination reference value in a direction of making it more difficult to determine that said catalyst means is deteriorated, as said number of times of measurement of said inversion period parameter increases, and wherein said catalyst deterioration-determining means finally determines that said catalyst means is deteriorated when a frequency at which it is determined that said catalyst means is deteriorated exceeds a predetermined value.

15. In a catalyst deterioration-determining system for an internal combustion engine having an exhaust system, catalyst means arranged in said exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for carrying out determination of deterioration of said catalyst means, based on said output from said oxygen concentration-detecting means during execution of air-fuel ratio feedback control by said air-fuel ratio control means, the improvement, wherein:

said catalyst deterioration-determining means includes measuring means for measuring an inversion period parameter representative of a repetition period of change in said output from said oxygen concentration-detecting means over a predetermined diagnosis period, average value-calculating means for calculating an average value of values of said inversion period parameter measured by said measuring means over different diagnosis periods as said predetermined diagnosis period, standard deviation-calculating means for calculating a standard deviation of said inversion period parameter, and deterioration index-updating means for updating a deterioration index representative of a central value of said inversion period parameter when said average value calculated by said average value-calculating means exceeds a monitoring region corresponding to said standard deviation calculated by said standard deviation-calculating means, said catalyst deterioration-determining means carrying out said determination of deterioration of said catalyst means, based on said updated deterioration index.

16. A catalyst deterioration-determining system as claimed in claim 15, wherein said standard deviation-calculating means calculates said standard deviation of said inversion period parameter, based on an average value of a difference between said inversion period parameter and said average value thereof.

17. A catalyst deterioration-determining system as claimed in claim 15 or 16, including monitoring region-updating means for updating said monitoring region, based on said deterioration index updated by said deterioration index-updating means.

18. A catalyst deterioration-determining system as claimed in claim 15 or 16, wherein said deterioration index-updating means updates said deterioration index by multiplying a difference between said average value calculated by said average value-calculating means and said deterioration index by a predetermined coefficient, and adding a resulting product to said deterioration index, said predetermined coefficient being set to a value smaller than 1.

19. A catalyst deterioration-determining system as claimed in claim 15 or 16, wherein said average value-calculating means calculates said average value of said inversion period parameter by a moving average method.

20. A catalyst deterioration-determining system as claimed in claim 15 or 16, wherein said measuring means measures a first parameter representative of said repetition period of change in said output from said oxygen concentration-detecting means and a second parameter representative of a flow rate of exhaust gases emitted from said engine, and uses a combination of the measured first and second parameters as said inversion period parameter.

21. A catalyst deterioration-determining system as claimed in any of claims 15 or 16, wherein said predetermined diagnosis period is included in one operating period of said engine, said measuring means measuring said inversion period parameter once over said one operating period of said engine.

* * * * *